US005716558A

United States Patent [19]

Nielsen et al.

[11] Patent Number: 5,716,558

[45] Date of Patent: Feb. 10, 1998

[54] METHOD FOR PRODUCING COATING POWDERS CATALYSTS AND DRIER WATER-BORNE COATINGS BY SPRAYING COMPOSITIONS WITH COMPRESSED FLUIDS

[75] Inventors: Kenneth Andrew Nielsen, Charleston; John Nicholas Argyropoulos, Scott Depot, both of W. Va.; Burkhard Eric Wagner, Highland Park, N.J.

[73] Assignee: Union Carbide Chemicals & Plastics Technology Corporation, Danbury, Conn.

[21] Appl. No.: 338,900

[22] Filed: Nov. 14, 1994

[51] Int. Cl.[6] .......... B29B 9/10

[52] U.S. Cl. .......... 264/13

[58] Field of Search .......... 264/13, 5

[56] References Cited

U.S. PATENT DOCUMENTS

| | | | |
|---|---|---|---|
| 4,582,731 | 4/1986 | Smith | 427/421 |
| 4,734,227 | 3/1988 | Smith | 264/13 |
| 4,734,451 | 3/1988 | Smith | 524/493 |
| 4,737,384 | 4/1988 | Murthy et al. | 427/369 |
| 4,826,699 | 5/1989 | Soe | 426/564 |
| 4,882,107 | 11/1989 | Cavender et al. | 264/51 |
| 4,923,720 | 5/1990 | Lee et al. | 427/422 |
| 5,009,367 | 4/1991 | Nielsen | 239/3 |
| 5,027,742 | 7/1991 | Lee et al. | 118/300 |
| 5,057,342 | 10/1991 | Hoy et al. | 427/422 |
| 5,066,522 | 11/1991 | Cole et al. | 427/422 |
| 5,088,443 | 2/1992 | Hastings et al. | 118/314 |
| 5,106,650 | 4/1992 | Hoy et al. | 427/27 |
| 5,106,659 | 4/1992 | Hastings et al. | 427/421 |
| 5,290,827 | 3/1994 | Shine | 523/340 |

FOREIGN PATENT DOCUMENTS

| | | |
|---|---|---|
| 59-16701A | 11/1984 | Japan . |
| 1-176437 | 7/1989 | Japan . |

OTHER PUBLICATIONS

Loth, et al, Int. J. Pharm. 32(2-3):265-7 1986 (see Ch.A. 105 197085).

Mohamed, et al, ACS Symp. Ser. 406: 355, 1989.

Dixon, D.J. et al, "Polymeric Materials Formed by Precipitation with a Compressed Fluid Antisolvent" AIChE Journal, vol. 39, No. 1 pp.127139, Jan. 1993.

*Primary Examiner*—Mary Lynn Theisen
*Attorney, Agent, or Firm*—M. N. Reinisch

[57] ABSTRACT

This invention relates to methods for spraying liquid compositions containing volatile solvent by using compressed fluids, such as carbon dioxide or ethane, to form solid particulates, coating powders, and catalyst materials, which can be produced with narrow particle size distributions and can be sprayed at higher solids levels, in ambient air or with heated air applied to just the spray instead of a spray chamber. Novel catalyst supports can be produced having a beneficial morphology such as for olefin catalysis. Drier water-borne coatings can be applied to substrates by using compressed fluids to spray water-borne coating compositions having conventional water levels, thereby reducing runs and sags and shortening dry times.

11 Claims, 2 Drawing Sheets

METHOD FOR PRODUCING COATING POWDERS CATALYSTS AND DRIER WATER-BORNE COATINGS BY SPRAYING COMPOSITIONS WITH COMPRESSED FLUIDS

BRIEF SUMMARY OF THE INVENTION

1. Technical Field

This invention relates to spraying liquid compositions with solvent evaporation in order to produce drier compositions such as particulates and coating films. More particularly, this invention relates to methods for spraying liquid compositions containing volatile solvent by using compressed fluids, such as carbon dioxide or ethane, to form solid particulates, coating powders, and catalyst materials and to apply drier water-borne coatings from water-borne coating compositions having conventional water levels.

2. Background of the Invention

Improved methods are needed by which materials such as particulates, coating powders, and catalyst materials can be produced by spraying without requiring high energy use like that used in conventional spray drying. Methods are needed by which such materials can be produced at higher solids levels and without using hot gas, or by supplying a relatively small amount of heated gas locally to just the spray, instead of heating an entire spray chamber. Such methods would also enable temperature sensitive materials to be spray dried at lower temperature or at essentially ambient temperature. Furthermore, an improved method of producing such particulate materials is desirable wherein the powders produced have a narrow particle size distribution, which often improves the performance of powders in applications. For example, it is desirable for a coating powder to have minimal large particles which give poor coating appearance and minimal small particles which become overspray and waste and which build up to an unacceptable level in recycled powder. Furthermore, such a spray method of producing coating powders would be desirable as an alternative to costly milling or cryogenic grinding. Similarly, it is desirable for catalysts used in fluidized bed reactors, such as in polyethylene production, to have a narrow droplet size distribution for efficient use of the catalyst and to give more uniform pellets and better performance. An improved method is also needed by which water-borne coatings having conventional water levels can be sprayed but with drier coating films applied, in order to improve coating performance and shorten dry times.

DISCLOSURE OF THE INVENTION

Particulates, coating powders, and catalyst materials can be produced by spraying at higher solids levels and at lower temperature, without using hot gas or by supplying heated gas to the spray instead of an entire spray chamber. Furthermore, they can be produced with relatively narrow particle size distributions. Catalyst particles can also be produced having a novel, beneficial morphology. Water-borne coatings with conventional water levels can be sprayed with drier coating films applied, thereby improving their performance and shortening dry times.

In one embodiment, this invention relates to a process for forming solid particulates by spraying a liquid solvent-borne composition, which comprises:

(1) forming a liquid mixture in a closed system, said liquid mixture comprising:

(a) a solvent-borne composition comprising:

(i) a nonvolatile materials fraction which is solid or capable of becoming solid, which is capable of being sprayed, and which is capable of forming solid particulates by solvent evaporation when sprayed in (2); and (ii) a solvent fraction which is sufficiently volatile to render said solvent-borne composition capable of forming solid particulates when sprayed in (2); and (b) at least one compressed fluid in an amount which when added to (a) renders said liquid mixture capable of forming a substantially decompressive spray in (2), wherein the compressed fluid is a gas at standard conditions of 0° Celsius and one atmosphere pressure (STP); and (2) spraying said liquid mixture at a temperature and pressure that gives a substantially decompressive spray by passing the mixture through an orifice into an environment suitable for forming solid particulates by solvent evaporation, wherein the spray has an average particle size greater than about one micron.

In a preferred embodiment, the at least one compressed fluid is selected from the group consisting of carbon dioxide, nitrous oxide, ethane, ethylene, propane, and propylene. The most preferred compressed fluids are carbon dioxide and ethane. The compressed fluid is preferably a supercritical fluid at the temperature and pressure at which the liquid mixture is sprayed. The liquid mixture is preferably heated to a temperature that substantially compensates for the drop in spray temperature that occurs due to expansion cooling of the decompressing compressed fluid, in order to increase the evaporation rate of solvent from the spray.

In another preferred embodiment, the solvent fraction of the solvent borne composition has an average relative evaporation rate greater than about 70.

In still another preferred embodiment, the solid particulates thus formed have a narrow particle size distribution.

In yet another preferred embodiment, at least one gas flow is applied to the substantially decompressive spray to increase the rate of turbulent mixing or the temperature within the spray or both.

In another embodiment, this invention relates to a process for forming a coating-powder by spray drying a liquid precursor coating-powder composition, which comprises:

(1) forming a liquid mixture in a closed system, said liquid mixture comprising:

(a) a precursor coating-powder composition comprising:

(i) a solids fraction containing dry ingredients of a coating-powder and which is capable of forming powder by solvent evaporation when sprayed in (2); and (ii) a solvent fraction which is at least partially miscible with (i) and which is sufficiently volatile to render said precursor coating-powder composition capable of forming powder when sprayed in (2); and (b) at least one compressed fluid in an amount which when added to (a) renders said liquid mixture capable of forming a substantially decompressive spray in (2), wherein the compressed fluid is a gas at standard conditions of 0° Celsius and one atmosphere pressure (STP); and (2) spraying said liquid mixture at a temperature and pressure that gives a substantially decompressive spray by passing the mixture through an orifice into an environment suitable for forming coating powder by solvent evaporation.

In a preferred embodiment, the at least one compressed fluid is carbon dioxide or ethane and is a supercritical fluid at the temperature and pressure at which said liquid mixture is sprayed.

In another preferred embodiment, the coating-powder formed has a narrow particle size distribution with a span of less than about 2.0.

In still another preferred embodiment, the coating-powder contains at least one polymer selected from the group consisting of epoxies, polyesters, acrylics, polyurethanes, epoxy-polyester hybrids, blocked isocyanates, cellulosics, vinyls, polyamides, and hybrid polymers thereof.

In yet another preferred embodiment, the process may further comprise depositing said coating-powder on to a substrate and heating the substrate to form a coating film.

In another preferred embodiment, at least one gas flow is applied to the substantially decompressive spray to increase the rate of turbulent mixing or the temperature within the spray or both.

In still another embodiment, this invention relates to a process for forming a catalyst, catalyst support, or catalyst precursor by spray drying a liquid precursor catalyst composition, which comprises:

(1) forming a liquid mixture in a closed system, said liquid mixture comprising:

(a) a precursor catalyst composition comprising:

(i) a solids fraction containing dry ingredients of a catalyst, catalyst support, or catalyst precursor and which is capable of forming particulates by solvent evaporation when sprayed in (2); and (ii) a solvent fraction which is at least partially miscible with (i) and which is sufficiently volatile to render said precursor catalyst composition capable of forming particulates when sprayed in (2); and (b) at least one compressed fluid in an mount which when added to (a) renders said liquid mixture capable of forming a substantially decompressive spray in (2), wherein the compressed fluid is a gas at standard conditions of 0° Celsius and one atmosphere pressure (STP); and (2) spraying said liquid mixture at a temperature and pressure that gives a substantially decompressive spray by passing the mixture through an orifice into an environment suitable for forming particulates by solvent evaporation.

In a preferred embodiment, the solids fraction contains at least one organic polymer and at least one inorganic or organometallic compound, and the catalyst, catalyst support, or catalyst precursor particulate formed comprises an aggregate of solid microparticulates containing said at least one inorganic or organometallic compound which are at least partially enclosed in a polymeric shell.

In yet another embodiment, this invention relates to a process for forming solid particulates by spray drying a liquid water-borne composition, which comprises:

(1) forming a liquid mixture in a closed system, said liquid mixture comprising:

(a) a water-borne composition comprising:

(i) a nonvolatile materials fraction which is solid or capable of becoming solid, which is capable of being sprayed, and which is capable of forming solid particulates by evaporation when sprayed in (2); and (ii) a solvent fraction containing at least water; which is sufficiently volatile to render, and contains water in an amount which renders, said water-borne composition capable of forming solid particulates when sprayed in (2); and (b) at least one compressed fluid which is a supercritical fluid at the temperature and pressure at which said liquid mixture is sprayed and which is substantially present in said liquid mixture as a finely dispersed liquid compressed fluid phase, in an amount which renders said liquid mixture capable of forming a substantially decompressive spray in (2), wherein the compressed fluid is a gas at standard conditions of 0° Celsius and one atmosphere pressure (STP); and (2) spraying said liquid mixture at a temperature above about 40° Celsius and a pressure that gives a substantially decompressive spray by passing the mixture through an orifice into an environment suitable for forming solid particulates by evaporation.

This invention also relates to a process for applying a water-borne coating to a substrate which comprises:

(1) forming a liquid mixture in a closed system, said liquid mixture comprising:

(a) a water-borne coating composition containing a water level which renders the liquid mixture capable of being sprayed conventionally with no compressed fluid; which is capable of forming a coating on a substrate; and which contains a solvent fraction having at least about 35 percent water by weight; and (b) at least one compressed fluid which is substantially present in said liquid mixture as a finely dispersed liquid compressed fluid phase; and which is in an amount which renders said liquid mixture capable of forming a substantially decompressive spray, wherein the compressed fluid is a gas at standard conditions of 0° C. and one atmosphere pressure (STP); and (2) spraying said liquid mixture at a temperature and pressure that gives a substantially decompressive spray by passing the mixture through an orifice into an environment suitable for water evaporation and applying a coating to a substrate.

In a preferred embodiment, the water-borne coating composition contains at least one polymer which is a water-dispersible polymer or a water-soluble polymer.

In another preferred embodiment, the compressed fluid is carbon dioxide and the pH of said liquid mixture is controlled to prevent polymer precipitation when the carbon dioxide is admixed with said water-bone coating composition.

In still another preferred embodiment, the at least one compressed fluid is carbon dioxide or ethane and is a supercritical fluid at the temperature and pressure at which said liquid mixture is sprayed, and said water-borne coating composition contains at least one organic solvent that is capable of being extracted from said water-borne coating composition into the compressed fluid, thereby enabling said compressed fluid to form the liquid compressed fluid phase at the supercritical temperature and pressure.

In yet another preferred embodiment, the at least one compressed fluid is carbon dioxide or ethane and is a supercritical fluid at the temperature and pressure at which said liquid mixture is sprayed, and said liquid mixture contains in addition at least one organic solvent (c) which is immiscible with said water-borne coating composition; which is at least partially miscible with said at least one compressed fluid under pressure; and which is present at least in an amount which enables said compressed fluid to form the liquid compressed fluid phase at the supercritical temperature and pressure.

DETAILED DESCRIPTION

Figure 1:
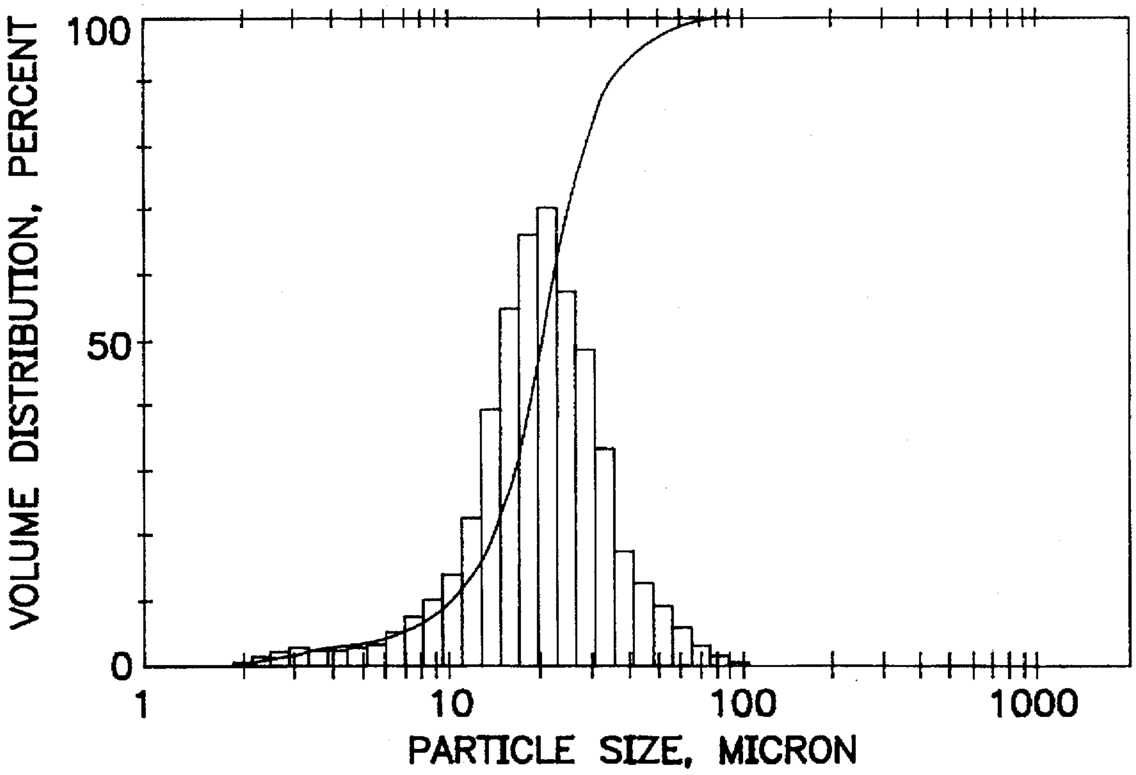
FIG. 1 is a narrow particle size distribution having a span of 1.3 and average particle size of 21 microns produced by spraying a solution of a solid acrylic polymer, volatile solvent, and compressed carbon dioxide as a decompressive spray.

It has been found that, by using the methods of this invention, liquid solvent-borne compositions can be sprayed with compressed fluids such as carbon dioxide and ethane to form solid particulates, coating powders, catalyst materials, and the like, by solvent evaporation at mild conditions without using large amounts of energy as in conventional spray drying. Furthermore, particulates and powders can be formed having relatively narrow particle size distributions. Liquid water-bone compositions and water-borne coatings with conventional water levels, for which compressed fluids such as carbon dioxide and ethane have very low solubility, can be sprayed by using a finely dispersed liquid compressed fluid phase in the composition or coating, to form solid particulates or to apply drier coatings with fine atomization to give good coating appearance and performance and shorter dry times.

It has been discovered that a substantially decompressive spray, produced by using at least one compressed fluid in a sufficiently high amount and at a suitable spray temperature and pressure, can produce a high rate of solvent evaporation from the spray if the solvent or solvent blend is sufficiently volatile, and thereby produce solid particulates, powders, or drier water-borne coating films from water-borne coating compositions having conventional water levels that enable them to be sprayed by conventional spray methods.

It has been discovered that decompressive sprays can indeed produce enhanced evaporation of solvent provided that the solvent or solvent profile has a sufficiently high average relative evaporation rate, even though very little evaporation occurs for the slow evaporating solvents used in coating concentrates. Without wishing to be bound by theory, it is believed that the high evaporation rate is caused by an exceptionally high mass transfer rate that occurs during formation of the decompressive spray due to the extremely rapid gasification of the dissolved compressed fluid, which overcomes effects of the rapid temperature drop that suppresses volatility. The fast and medium evaporating solvents are much more affected by these intense mass transfer conditions than the slow evaporating solvents. Furthermore, it has been discovered that the expansion of the decompressing gas that generates the decompressive spray can overcome the higher viscosity generated during the atomization process by the greater evaporation of the faster evaporating solvents than occurs in coating application. Therefore fine atomization can result. Indeed, if the viscosity becomes too high, then the decompressive spray is incapable of forming, but the belief that slow evaporating solvent is required in order to maintain sufficient fluidity during atomization has been found not to be true.

As used herein, it will be understood that a "compressed fluid" is a fluid which may be in its gaseous state, its liquid state, or a combination thereof, or is a supercritical fluid, depending upon (i) the particular temperature and pressure to which it is subjected, (ii) the vapor pressure of the fluid at that particular temperature, and (iii) the critical temperature and critical pressure of the fluid, but which is in its gaseous state at standard conditions of 0° Celsius temperature and one atmosphere absolute pressure (STP). As used herein, a "supercritical fluid" is a fluid that is at a temperature and pressure such that it is at, above, or slightly below its critical point.

Compounds which may be used as compressed fluids in the present invention include but are not limited to carbon dioxide, nitrous oxide, ammonia, xenon, ethane, ethylene, propane, propylene, butane, isobutane, chlorotrifluoromethane, monofluoromethane, and mixtures thereof. Preferably, the compressed fluid is or can be made environmentally compatible or can be readily recovered from the spray environment. The utility of any of the above-mentioned compressed fluids in the practice of the present invention will depend upon the composition used, the temperature and pressure of application, and the inertness and stability of the compressed fluid.

In general, carbon dioxide, nitrous oxide, ethane, ethylene, propane, and propylene are preferred compressed fluids in the present invention. However, nitrous oxide should be used only under safe and stable conditions. Due to environmental compatibility, low toxicity, and high solubility, carbon dioxide and ethane are more preferred compressed fluids. Due to low cost, non-flammability, and wide availability, carbon dioxide is generally the most preferred compressed fluid. However, use of any of the aforementioned compounds and mixtures thereof are to be considered within the scope of the present invention.

As used herein, the phrases "solvent-borne composition", "coating-powder composition", "precursor catalyst composition", "water-borne composition", "water-borne coating composition", "coating composition", "coating formulation", and "coating material" are understood to mean compositions, formulations, and materials that have no compressed fluid admixed therewith.

As used herein, the term "solvent" is understood to mean conventional solvents that have no compressed fluid admixed therewith and which are in the liquid state at conditions of about 25° C. temperature and one atmosphere absolute pressure.

The liquid solvent-borne compositions that may be used with this invention are generally comprised of 1) a nonvolatile materials fraction which is solid or capable of becoming solid, which is capable of being sprayed, and which is capable of forming solid particulates by solvent evaporation when sprayed as a decompressive spray; and 2) a solvent fraction which is sufficiently volatile to render said solvent-borne composition capable of forming solid particulates when sprayed as a decompressive spray.

In general, the nonvolatile materials fraction is the fraction of the solvent-borne composition that remains after the solvent fraction has evaporated and therefore it is the fraction that forms the solid particulates. The nonvolatile materials fraction comprises polymers, resins, waxes, organic compounds, inorganic compounds, and other nonvolatile materials that are solid or a capable of becoming solid during spraying, such as rapidly reacting two-component polymer systems that are mixed as they are sprayed to initiate the rapid reaction. Dilution or blocking by the dissolved compressed fluid may retard the reaction until the mixture is sprayed. Examples of particulates that may be formed include plastics, resins, detergents, pesticides, pigments, dyestuffs, organic chemicals, and inorganic chemicals. The nonvolatile materials fraction may be sprayed as a solution, emulsion, dispersion, or suspension in the solvent fraction. In general, divided solids that are dispersed should have particle sizes that are sufficiently small to maintain a dispersed state and to pass readily through the spray orifice. Divided solids with particle sizes too large to maintain a stable dispersion may be used if a dispersion or suspension can be formed and maintained by agitation. Preferably, the nonvolatile materials fraction contains dispersed solids that have an average particle size less than about 25 microns and more preferably less than about 10 microns.

Solid polymers may be dissolved or dispersed, but generally they are at least partially miscible with the solvent fraction. Solid polymers should have sufficiently high molecular weight and a sufficiently high glass transition temperature to form solid particulates by solvent evaporation. The glass transition temperature should be above about 25° C., preferably above 30° C., more preferably above 40° C., and most preferably above 50° C. Suitable polymers include but are not limited to acrylics, polyesters, cellulosics, polyolefins, epoxies, alkyds, vinyls, polyurethanes, silicone polymers, rubbers, and thermoplastic polymers in general, and mixtures thereof.

The nonvolatile materials fraction must be a sufficiently high fraction of the solvent-bone composition to be capable of forming solid particulates by solvent evaporation when sprayed by the decompressive spray and to form particulates of surf dent size. The fraction required will generally depend upon the volatility of the solvent fraction, with a higher fraction being required for lower volatility. The nonvolatile materials fraction should generally be greater than about 10% by weight of the solvent-borne composition, preferably greater than about 15%, more preferably greater than about 20%, and most preferably greater than about 25%. Generally a higher fraction is desirable so as to lessen the amount of solvent that must be evaporated. However, the nonvolatile materials fraction must not be so excessively high a fraction that it renders the solvent-borne composition unable to form a substantially decompressive spray or to form a suitable particulate size. The suitable upper limit will depend upon the physical and chemical characteristics of the particular nonvolatile materials fraction, such as the molecular weight of polymers, the degree of intermolecular cohesion, the mount and nature of dispersed solids, reactivity, and the like. Generally lower molecular weight and less cohesive materials can be sprayed at higher nonvolatile materials levels because they remain more fluid at the higher levels. The nonvolatile materials fraction should generally be less than about 90% by weight of the solvent-borne composition, preferably less than about 80%, more preferably less than about 70%, and most preferably less than about 60%.

The viscosity of solvent-borne compositions that are capable of forming a decompressive spray has proven to be an insensitive correlating parameter for sprayability. Solvent-borne compositions have been finely atomized with viscosities that range from below 100 to above 20,000 centipoise. However, the solvent-borne composition will generally have a viscosity of from about 500 to about 5000 centipoise, preferably from about 800 to about 3000 centipoise, as measured at a temperature of about 25° C.

The nonvolatile materials fraction must be capable of forming solid particulates by solvent evaporation when sprayed by the decompressive spray. The nonvolatile materials fraction preferably should retain a sufficiently "open" structure as the solid particulates are formed to facilitate diffusion, transport, and evaporation of solvent from the interior of the particulates.

In addition to the nonvolatile materials fraction, a solvent fraction is also employed which is sufficiently volatile to render said solvent-borne composition capable of forming solid particulates when sprayed by the decompressive spray. The solvent may perform a variety of functions, such as to dissolve polymers and other nonvolatile materials, to reduce viscosity, to provide a carrier medium for dispersions, and the like. Generally the solvent fraction is at least partially miscible with the nonvolatile materials fraction. Polymeric compositions generally contain at least one active solvent for the polymer. The selection of a particular solvent fraction for a given nonvolatile materials fraction to obtain desired solubility and dispersibility characteristics is well known to those skilled in the art.

Based on a relative evaporation rate (RER) to a butyl acetate standard equal to 100 using ASTM Method D3599 at 25° C. and one atmosphere pressure, to be sufficiently volatile, the solvent fraction desirably has an average relative evaporation rate greater than about 70, where the average relative evaporation rate of a mixture of solvents is calculated as the inverse weighted average of the individual solvent relative evaporation rates, that is, $1/RER_{AVG}=M_1/RER_1+M_2/RER_2+M_3/RER_3+\ldots$, where $M_i$ are the weight fractions of the individual solvents. The average relative evaporation rate is preferably greater than about 85, more preferably greater than about 105, still more preferably greater than about 140, and most preferably greater than about 175. The average relative evaporation rate is preferably less than about 4000, more preferably less than about 3000, and most preferably less than about 2000.

In general, the solvent fraction preferably contains less than about 10% by weight of solvents with relative evaporation rates below about 20, more preferably less than 5%, and most preferably less than 2%. In addition, the solvent fraction preferably contains less than about 5% by weight of solvents with relative evaporation rates below about 10, more preferably less than about 2%, and most preferably about 0%.

Solvents comprising the solvent fraction should be sufficiently fast evaporating to give a sufficiently high average relative evaporation rate. Suitable solvents include but are not limited to ketones such as acetone, methyl ethyl ketone, methyl propyl ketone, methyl isobutyl ketone, methyl butyl ketone, and other aliphatic ketones; esters such as methyl acetate, ethyl acetate, isopropyl acetate, n-propyl acetate, isobutyl acetate, butyl acetate, ethyl propionate, and other alkyl carboxylic esters; ethers such as isopropyl ether, tetrahydrofuran, ethyl butyl ether, ethyl isopropyl ether, and other aliphatic ethers; volatile glycol ethers such as ethylene glycol dimethyl ether, ethylene glycol diethyl ether, and propylene glycol monomethyl ether; alcohols such as methanol, ethanol, propanol, isopropanol, isobutanol, and other aliphatic alcohols; hydrocarbons such as hexane, toluene, Varnish Makers and Painters (VM&P) naptha, octane, 3-methyl heptane, 2,2-dimethyl hexane, and other aliphatics; and nitroalkanes such as nitroethane and nitropropane.

For spraying, the solvent-borne composition is first admixed with at least one compressed fluid to form a liquid mixture in a closed system, the compressed fluid being in an amount which renders the liquid mixture capable of forming a substantially decompressive spray. The liquid mixture is then sprayed at a temperature and pressure that gives a substantially decompressive spray by passing the mixture through an orifice into an environment suitable for forming solid particulates by solvent evaporation. Substantially decompressive sprays generally form within a relatively narrow range of combinations of compressed fluid concentration and spray temperature and pressure, which varies with the characteristics of the particular solvent-borne composition. Important characteristics are the composition and amount of the nonvolatile materials fraction, the composition of the solvent fraction, and the composition of the compressed fluid used. Therefore, the conditions suitable for forming the substantially decompressive spray generally must be determined experimentally for a given spray mixture and spray tip. However, the decompressive spray region typically follows the solubility limit of the compressed fluid in the solvent-borne composition as it changes with temperature and pressure, as disclosed in copending U.S. patent application Ser. No. 129,256, filed Sep. 29, 1993 (now U.S. Pat. No. 5,464,154). At constant pressure, the solubility decreases at higher temperature. The solubility increases with higher pressure. The decompressive spray region generally occurs at a compressed fluid concentration that is somewhat below the solubility limit, often being within about five weight percentage points of it or less. Frequently spraying is done at the solubility limit, or just below or above it. A sufficiently high spray pressure is used to obtain a sufficiently high solubility. The spray temperature and compressed fluid concentration are then adjusted to give a decompressive spray having the desired characteristics for a particular application, such as desired particle size. The solubility will also change with the compressed fluid used; carbon dioxide generally has significantly higher solubility than ethane. The solubility will also change with the level of nonvolatile materials fraction, being lower for a higher solids content. At compressed fluid concentrations above the solubility limit, at higher pressures the liquid mixture generally comprises a liquid nonvolatile materials phase and a liquid compressed fluid phase containing extracted solvent, whereas at lower pressures the excess compressed fluid forms a gaseous phase.

In general, the amount of compressed fluid used will be at least about 5% by weight, based upon the total weight of compressed fluid and solvent-borne composition, preferably at least about 10%, depending upon the solubility. For carbon dioxide being the compressed fluid, due to its generally higher solubility, the amount used more preferably will be at least about 15%, still more preferably at least about 20%, and most preferably at least about 25% and will exceed the minimum level required to obtain a substantially decompressive spray. The amount of compressed fluid may exceed the solubility limit if desired, but it should not be so excessively high that the excess compressed fluid phase unduly interferes with spray formation, such as by not remaining well dispersed in the liquid mixture or giving poor atomization. Using excess compressed fluid can sometimes be advantageous if the pressure is high enough for a liquid excess compressed fluid phase to form which extracts solvent from the liquid solvent-borne composition. Then less solvent must evaporate from the solvent-borne composition when sprayed. However, the solvent loss increases the viscosity, so the amount extracted should not be so great as to interfere with spray formation or cause undesirable spray characteristics, such as an overly large average particle size. If desired, excess compressed fluid can be used to separate a portion of the solvent from the spray mixture prior to spraying, by using the methods disclosed in U.S. Pat. No. 5,290,604. Generally the liquid mixture will contain less than about 60% compressed fluid by weight.

Although high spray pressures of 5000 psig and higher may be used, preferably the spray pressure of the liquid mixture is below about 3000 psig, more preferably below about 2500 psig. Very low pressure is generally not compatible with high compressed fluid solubility in the solvent-borne composition. Therefore, preferably the spray pressure is above about 50% of the critical pressure of the compressed fluid, more preferably above about 75% of the critical pressure, still more preferably above the critical pressure, and most preferably above about 125% of the critical pressure to give higher solubility at higher temperature. For carbon dioxide being the compressed fluid, preferably the spray pressure is above about 500 psig, more preferably above about 800 psig, still more preferably above about 1100 psig, and most preferably above about 1400 psig.

Preferably, the spray temperature of the liquid mixture is below about 150° C., more preferably below about 100° C., and most preferably below about 80° C. The temperature level that may be utilized will in general depend upon the characteristics of the solvent-borne composition, such as stability and heat sensitivity. Reactive systems must generally be sprayed at lower temperature than non-reactive systems. Preferably, the spray temperature of the liquid mixture is above about 25° C., more preferably above about 30° C., still more preferably above about 40° C., and most preferably above about 50° C. In order to increase the evaporation rate of solvent from the spray, the liquid mixture is preferably heated to a temperature that substantially compensates for the drop in spray temperature that occurs due to expansion cooling of the decompressing compressed fluid. Substantially decompressive sprays can generally be formed over a range of temperatures by varying the amount of compressed fluid accordingly as the solubility varies. In order to evaporate solvent more rapidly from the spray to form solid particulates, it is desirable for a higher spray temperature to be used. The spray temperature should be sufficiently high to provide sufficiently fast solvent evaporation for the average relative evaporation rate of the solvent fraction used and the amount of solvent that must be evaporated. Generally a higher spray temperature is preferred for a lower average relative evaporation rate.

Preferably the at least one compressed fluid is a supercritical fluid at the temperature and pressure at which the liquid mixture is sprayed.

To spray polymeric solvent-borne compositions with enhanced atomization, the liquid mixture desirably contains the at least one compressed fluid in an amount that enables the liquid mixture to form a liquid compressed fluid phase at the spray temperature, and the spray pressure desirably is above the minimum pressure at which the liquid mixture forms a liquid compressed fluid phase at the spray temperature, as disclosed by the methods in U.S. Pat. No. 5,290,603. Preferably, the spray pressure is above or just below the maximum pressure at which the liquid mixture forms a liquid compressed fluid phase at the spray temperature. Without wishing to be bound by theory, enhanced atomization is believed to result because the dissolved compressed fluid, during depressurization in the spray orifice, nucleates to form a liquid compressed fluid phase before forming gaseous compressed fluid, instead of nucleating directly to a gaseous compressed fluid phase. Therefore, nucleation occurs more quickly, so gasification of the compressed fluid is more intense.

An orifice is a hole or an opening in a wall or housing, such as in a spray tip. Spray orifices, spray tips, spray nozzles, and spray guns used for conventional and electrostatic airless and air-assisted airless spraying of coating formulations are generally suitable for spraying the liquid mixtures of the present invention. Spray guns, nozzles, and tips are preferred 1) that do not have excessive flow volume between the orifice and the valve that turns the spray on and off and 2) that do not obstruct the wide angle at which the spray typically exits the spray orifice. The most preferred spray tips and spray guns are the UNICARB® spray tips and spray guns manufactured by Nordson Corporation. Orifice sizes of from about 0.007-inch to about 0.0254inch nominal diameter are preferred, although smaller and larger orifice sizes may be used. Devices and flow designs, such as pre-orifices or turbulence promoters, that promote turbulent or agitated flow in the liquid mixture prior to passing the mixture through the orifice may also be used. The pre-orifice preferably does not create an excessively large pressure drop in the flow of liquid mixture. The spray pattern may be a circular spray such as is produced from a round orifice or it may be an oval or flat spray as produced by a groove cut through the orifice, as aforementioned. A wider, flat spray is favorable for mixing the ambient gas of the spray environment more rapidly into the interior of the decompressive spray, and therefore for increasing evaporation rate. However, for particularly viscous solvent-bone compositions or for high relative evaporation rates, a more oval or circular spray may be desirable to minimize polymer buildup on the spray tip. A favored spray tip design has two intersecting grooves cut through the orifice outlet at right angles to each other. This produces two intersecting spray fans which produce a more axisymmetric spray pattern but give better mixing of ambient gas into the spray interior than a circular spray.

A decompressive spray can generally be obtained at lower compressed fluid concentrations and lower temperatures, than are obtained with conventional short airless spray orifices, by using an elongated orifice passageway, as disclosed in copending U.S. patent application Ser. No. 061, 822, filed May 13, 1993. Without wishing to be bound by theory, it is believed that the elongated orifice passageway increases the time available for nucleation to a gaseous compressed fluid phase to occur, for the compressed fluid concentration, temperature, and pressure at which the liquid mixture is sprayed. Preferably, the ratio of length to diameter is greater than about 2 and less than about 20, more preferably greater than about 3 and less than about 15, most preferably greater than about 4 and less than about 10. So too, the length of the orifice passageway should desirably be in the range of from about 0.020 inch to about 0.400 inch, and more preferably from about 0.040 inch to about 0.300 inch.

The decompressive spray is formed by passing the liquid mixture through an orifice into a gaseous environment suitable for forming solid particulates by solvent evaporation. The environment in which the present invention is conducted is not narrowly critical. However, the pressure therein must be substantially lower than the spray pressure in order to obtain sufficient decompression of the compressed fluid to form the decompressive spray. Preferably, the gaseous environment is at or near atmospheric pressure. The environment will generally comprise air, but other gaseous environments may also be used, such as air with reduced oxygen content or inert gases such as nitrogen, carbon dioxide, helium, argon, or xenon, or a mixture. Oxygen or oxygen enriched air is not desirable, because oxygen enhances the flammability of organic materials. The gaseous environment should contain sufficiently low partial pressures of the solvents contained in the solvent-borne composition in order to promote sufficiently rapid evaporation of the solvent from the spray. Very low partial pressures are preferred. The partial pressures of the solvents should be maintained significantly below the point at which a fire or explosion hazard would exist in the spray environment.

The rate of solvent evaporation from the spray can be increased by applying at least one gas flow to the substantially decompressive spray to increase the rate of turbulent mixing or the temperature within the spray or both. A higher level of turbulent mixing increases the amount of drier external gas or air that is brought into the spray interior, which lowers the partial pressures of the solvents. Increasing the temperature within the spray increases the vapor pressure of the solvents.

To increase turbulent mixing, the at least one gas flow may comprise at least one gaseous jet applied to the spray, such as compressed gas jets used to assist atomization in air-assisted airless sprays or to modify the shape of the spray pattern. The assist gas is typically compressed air at pressures from about 10 to about 80 psig, with pressures of about 20 to about 60 psig preferred, but may also be air with reduced oxygen content or inert gases such as compressed nitrogen, carbon dioxide, or a mixture. Assist gas jets typically have little or no effect on the atomization of a decompressive spray. The gas flow may also be supplied by one or more auxiliary tubes feeding compressed gas or air that are positioned to discharge into the decompressive spray so as to increase the rate of turbulent mixing. Other methods may also be used.

The gas flow or assist gas jets may be heated to increase the temperature of the spray, such as to counteract the cooling effect of the compressed fluid. Although higher temperatures may be used, the temperature of the heated gas or air flow preferably is from about 30° C. to about 90° C., more preferably from about 50° C. to about 70° C. Higher temperature increases solvent volatility, but at a constant compressed gas pressure, higher temperature decreases the density of the gas and hence the mass flow rate, which can lower the mixing intensity. The at least one gas flow applied to increase the temperature within the substantially decompressive spray may also comprise providing heated gas or air adjacent to the spray so as to be entrained into the forming and formed spray. One method is to distribute the heated gas flow through a tubular distribution system that discharges the heated gas flow symmetrically to the spray in the vicinity of the spray tip. For example, the distribution system may consist of four discharge tubes positioned with two outlets on each side of the spray fan in the vicinity of the spray orifice. The at least one gas flow may also comprise blowing heated gas or air from a heater to the spray. Other methods may also be used.

As used herein, "solid particulates" are particulates that are substantially physically rigid particles or powders which may contain residual solvent and which includes highly viscous liquid particles that lack crystalline structure but which do not coalesce significantly with one another when in contact and do not flow perceptibly. The solid particulates are not required to have a particular shape or form and they may be porous.

In general, the average size of the solid particulates produced from the substantially decompressive spray can be controlled by adjusting the compressed fluid concentration, spray temperature and pressure, and solvent level in the solvent-borne composition. Solid particulates are produced which have an average size of about one micron or greater. The average size is preferably greater than about 5 microns, more preferably greater than about 10 microns, still more preferably greater than about 15 microns, and most preferably greater than about 20 microns. In general, larger particle sizes require more time to evaporate the solvent, the actual time depending upon the morphology of the particulates, the relative evaporation rates of the solvents, and the spray temperature and mixing characteristics. The average particle size in general should be less than about 200 microns, preferably less than about 150 microns, more preferably less than about 100 microns, still more preferably less than about 75 microns, and most preferably less than about 50 microns. The optimal particle size will depend upon the particular application requirements for the solid particulates. The optimal particle size for highly porous particulates will generally be higher than that for particulates with low porosity.

The decompressive spray produces uniform atomization that can produce solid particulates and powders that have a relatively narrow particle size distribution, which is often desirable to improve their performance in applications. Not only can the particle size distribution be narrow at a point in the spray, but the average particle size can be very uniform across the spray pattern, which gives a narrow overall particle size distribution for the entire spray, become some regions are not over-atomized or under-atomized. Nonuniform atomization across the spray pattern is frequently a problem with air and airless spray methods.

The width or narrowness of a particle size distribution can be given by its span. The span is defined as $(D_{0.9}-D_{0.1})/D_{0.5}$, where $D_{0.5}$ is the size for which 50% of the particle volume has smaller (or larger) size and equals the average particle size, $D_{0.1}$ is the size for which 10% of the particle volume has smaller size, and $D_{0.9}$ is the size for which 10% of the particle volume has larger size. Preferably, the particle size distribution has a span less than about 2.0, more preferably less than about 1.8, still more preferably less than about 1.6, and most preferably less than about 1.4. A narrower span has a smaller percentage of particles that may be too small or too large for a given application. The desirable span will vary with the application.

A narrow particle size distribution measured for solid particulates produced by the methods of the present invention is shown in FIG. 1. The solvent-borne composition contained 30% non-volatile materials fraction comprising solid acrylic polymer and 70% solvent fraction comprising methyl ethyl ketone. The liquid mixture contained 42.5% compressed carbon dioxide fluid and was sprayed at 60° C. and 1600 psi, at which temperature and pressure carbon dioxide is a supercritical fluid. The liquid mixture was heated to 60° C. to offset the cooling effect of the decompressing carbon dioxide in order to increase the evaporation rate. The decompressive spray in ambient air produced a spray dried powder having a very narrow particle size distribution with a low span of 1.3 and an average particle size of 21 microns. Only 11% of the particles by volume were below 10 microns and only 10% were above 36 microns.

The distance from the spray tip at which solid particulates are produced throughout the decompressive spray pattern will depend upon many variables such as the orifice size, particle size, relative evaporation rates of the solvents, the solvent level in the solvent-borne composition, spray temperature and pressure, the turbulent mixing intensity in the spray, application of heated gas, use of a pre-orifice, and other factors. The distance will depend upon the actual characteristics of a particular application. Increasing the level of turbulent mixing or the temperature in the spray or both generally produces solid particulates more uniformly throughout the spray pattern at a shorter distance. In general, the distance increases as the average relative evaporation rate of the solvent fraction decreases, until at unsuitably low average relative evaporation rates the spray remains liquid for excessively long distances. Although some solvent-borne compositions produce solid particulates uniformly throughout the spray pattern at short distances of about 6 inches to about 24 inches, other compositions require longer distances. A distance greater than about 24 inches is generally preferred for collecting the solid particulates from the spray, although shorter distances may be used for fast drying sprays. More preferably the distance is greater than about 36 inches and most preferably greater than about 48 inches, to provide more evaporation time. The solid particulates and powders may be collected from the spray by any means suitable for separating fine particulates from a flow of gas or air, such as by a cyclone separator, filtration, electrostatic deposition, and other means known to those skilled in the art.

If desired, the solid particulates and powder may be treated to remove residual solvent, such as by fluidization or mixing with air to strip solvent, drying, or by passing air through a storage container or bin.

This invention may also be used to form coating powder by spray drying a liquid precursor coating-powder composition containing 1) a solids fraction containing the dry ingredients of a coating powder and which is capable of forming powder by solvent evaporation when sprayed as a decompressive spray; and 2) a solvent fraction which is at least partially miscible with the solids fraction and which is sufficiently volatile to render said precursor coating-powder composition capable of forming powder when sprayed as a decompressive spray. For spraying, the precursor coating-powder composition is admixed with at least one compressed fluid to form a liquid mixture in a closed system, the compressed fluid being in an amount which renders the liquid mixture capable of forming a substantially decompressive spray. The liquid mixture is then sprayed at a temperature and pressure that gives a substantially decompressive spray by passing the mixture through an orifice into an environment suitable for forming coating powder by solvent evaporation. The aforementioned teachings pertaining to forming solid particulates are understood to pertain, where applicable, to forming coating powders by the methods of the present invention, as will be understood by those skilled in the art, with the following discussion being particular to coating powders.

The solids fraction of the precursor coating-powder composition contains the dry ingredients of a coating powder. As used herein, it is understood that the term "coating powder" includes coating powders and powder-coating compositions used for powder coating of substrates, as well as powder components for liquid coating compositions such as additives. As known by those skilled in the art, the dry ingredients of coating powders for powder-coating applications generally may comprise at least one thermosetting or thermoplastic polymer, a curing or cross-linking agent for thermosetting systems, plasticizers, stabilizers, flow additives, pigments, and extenders.

For use as a powder coating, the polymer should have low melt viscosity, to provide a smooth continuous film; good adhesion to the substrate; good physical properties such as toughness and impact resistance; light color; heat, chemical, and weathering resistance; and storage stability. Thermosetting coating powders generally use polymers that are cured by addition reactions instead of condensation reactions. The glass transition temperature of coating-powder thermosetting polymers should be high enough to prevent individual particles from sintering or fusing during transportation and storage. Refrigerated storage allows polymers with lower glass transition temperatures to be used. For room temperature storage, preferably the glass transition temperature is above about 40° C., more preferably above about 50° C. Polymers suitable for use in the coating powders of the present invention in general comprise those used in conventional powder coating and in particular include epoxies, polyesters, acrylics, polyurethanes, epoxy-polyester hybrids, cellulosics, vinyls, polyamides, and hybrid polymers thereof. Other polymers such as polyolefins may also be used. Polymer types that are not presently used for powder coating, because they are not compatible with cryogenic grinding or mechanical milling, may also be used with this invention. Thermosetting systems may use any of the curing or cross-linking agents commonly used in powder coating, such as blocked isocyanate polymers and triglycidyl isocyanurate.

Here again, the solids fraction must be a sufficiently high fraction of the precursor coating-powder composition to be capable of forming a coating powder by solvent evaporation when sprayed by the decompressive spray, and to form powder particles of sufficient size, but it must not be so excessively high as to be unable to form a substantially decompressive spray or to cause overly large particles to form. In general, the solids fraction should generally be greater than about 10% by weight of the precursor coating-powder composition, preferably greater than about 15%, more preferably greater than about 20%, and most preferably greater than about 25%. However, the solids level used will depend upon the properties of the polymer system and other components used and the appropriate level must generally be determined experimentally. Due to lower polymer molecular weights, thermosetting systems can generally be sprayed at higher solids levels than thermoplastic systems. For such systems, solids levels may be greater than about 40%, preferably greater than about 50%, although lower levels may be used as well. For applications wherein the coating powder produced by the decompressive spray is applied directly to a substrate, polymers with lower molecular weight and lower glass transition temperature may be used than are used in conventional coating powders which must be stored and transported. Therefore, the solids level achievable can be correspondingly higher, and may be 70% to 90% or higher, depending upon the application requirements and the viscosity. Although higher and lower viscosities may be used, the precursor coating-powder composition will generally have a viscosity of from about 500 to about 5000 centipoise, preferably from about 800 to about 3000 centipoise, as measured at a temperature of about 25° C.

The solvent fraction is chosen to be at least partially miscible with the solids fraction and to be sufficiently volatile. Any of the aforementioned solvents may be used depending upon their suitability and solubility characteristics for the particular system. Generally at least one solvent is an active solvent for the polymer used. Here again, the solvent fraction desirably has an average relative evaporation rate greater than about 70, preferably greater than about 85, more preferably greater than about 105, still more preferably greater than about 140, and most preferably greater than about 175. The average relative evaporation rate is preferably less than about 4000, more preferably less than about 3000, and most preferably less than about 2000.

The at least one compressed fluid is preferably carbon dioxide or ethane and it is preferably a supercritical fluid at the temperature and pressure at which the liquid mixture is sprayed. At least one gas flow may be applied to the substantially decompressive spray to increase the rate of turbulent mixing or the temperature within the spray or both, as discussed previously.

For use in powder coating, the coating powders formed by the methods of the present invention desirably have an average particle size greater than about 10 microns, preferably greater than about 15 microns, and most preferably greater than about 20 microns. The average particle size is preferably less than about 125 microns, more preferably less than about 100 microns, still more preferably less than about 75 microns, and most preferably less than about 50 microns. The coating powders desirably have a narrow particle size distribution, preferably with a span less than about 2.0, more preferably less than about 1.8, still more preferably less than about 1.6, and most preferably less than about 1.4.

The coating powder thus formed may then be deposited on to a substrate, either directly or indirectly, and the substrate heated to form a coating film thereon, as known by those skilled in the art.

In the field of heterogeneous catalysis, there is a continuing need for morphologically improved catalyst supports and catalyst precursors. The performance of a catalyst is frequently affected by its morphological form. One step in the formation of a component of a catalytic material often consists of drying the material, and imparting this desired shape upon the material as part of the drying process. Morphological features such as shape, particle size, particle size distribution, porosity, and crystallinity can be controlled, to a greater or lesser form, via techniques such as crystallization, impregnation, or spray drying.

While the following discussion will focus on olefin polymerization catalyst systems, those skilled in the art of catalysis will appreciate that the methods of this invention may be applied to other catalyst systems as well, and the methods are not limited to olefin polymerization.

Spray drying is particularly advantageous for olefin polymerization catalyst systems, in that spherical or at least reasonably round particles of reasonably uniform size can frequently be obtained on a large scale. A solution or slurry of either an inert support, a reactive support, or a catalyst precursor can be spray dried. Inert carriers are exemplified by microspheroidal silicas, reactive carriers by magnesium salts such as magnesium halides or magnesium hydrocarbyl carbonates, and catalyst precursors by magnesium halide/titanium halide/electron donor adducts.

The thermal spray-drying processes are typically conducted in solvents such as water, or organic solvents such as alcohols, ethers, or esters. The material to be spray-dried is at least partially dissolved, often in the presence of inorganic or organic fillers. A hot solution or slurry containing the solid component to be spray-dried is typically ejected from an orifice in the form of a spray, and the liquid particle is made to dry during flight via evaporation. The droplet must be substantially rigid within a few seconds so as not to be deformed or destroyed upon impact.

Spray-drying of these materials is, however, not without problems. The energy for rapid evaporation of the solvent component is typically supplied in the form of heat, and the particles are solidified via evaporation. The solutions thus have to be as hot as possible, which in the case of organic solvents and organometallic reagents may lead to decomposition, undesirable side reactions, or to premature precipitation of reaction products. Even when higher temperatures are feasible, process limitations interfere with successful spray drying. If the heat capacity of the organic solvent is low, not enough thermal energy can be imparted to allow full drying; if the vapor pressure of the solvent is too low, not enough evaporation will take place in the few seconds before the liquid droplets hit the walls of the spray drier. During spray drying at a large commercial scale, removal of the evaporated solvent is becoming a greater and greater challenge for process and environmental reasons. Organic solvents can frequently not be captured, removed, and confined rapidly enough, so that the throughput suffers. In the case of spray drying with flammable liquids, large amounts of inert gases such as nitrogen are required for the solvent removal process.

Spray drying imposes limitations on the physical form of the particle as well. One problem arises from the fact that the solvent comprises most of the volume of the droplet, that is, the solids content of the solution is low. The size of the liquid droplets cannot be increased beyond a certain size without having the droplet fall apart. Loss of the major volume fraction of that droplet on evaporation frequently leads to residual solid particles having a size much smaller than desired. Other means of increasing the amount of solids in a droplet also have limitations. Increasing the solids content of a solution are frequently not feasible, because the material is insufficiently soluble or the viscosity becomes too high to spray the material. Increases in the solids content of a slurry leads to more frequent clogging of piping and instrumentation, as well as to poorly dispersed product. While the material science aspects of the drying process are not sufficiently understood in all cases, it can nevertheless be observed that the thermal evaporation process leads to non-uniform drying of the particle, as seen by skin formation (hollow shells), cracked particles, and differential precipitation of chemically different components within the particle.

In contrast, by using compressed fluids according to the methods of the present invention, higher solids level can be achieved because less solvent is required for spraying; the evaporation rate can be increased; less thermal energy is required; lower spray temperature keeps the material stable; less high-boiling solvent need be removed; increased solubility may be obtained, especially in the presence of polymeric binders; less solvent need be recovered from the effluent; and less purge gas may be required. Furthermore, unique particle morphology may be formed, depending upon the composition used, and the catalyst supports may have a narrower particle size distribution.

Two types of reactive magnesium-containing supports are spray dried. Formation of magnesium hydrocarbyl carbonates from magnesium hydrocarbyl oxides and gaseous carbon dioxide is well known in the art (see U.S. Pat. No. 4,923,446). The magnesium hydrocarbyl carbonates can be represented by the formula $Mg(OR)(OR').xCO_2$, wherein each of R and R' represent alkyl or aryl groups, and x has a value of from 0.1 to 2.0. This material is believed to be made up of a mixture of two, and possibly more, components (H. L. Finkbeiner and G. W. Wagner, *J. Org. Chem.* 28: 215, 1963). These components include a monoalkoxy monocarbonate and a dicarbonate of formula $Mg(OCOOR)_2$. Among other catalytic applications, these supports find use as components of gas-phase olefin polymerization catalysts, as described in U.S. Pat. Nos. 4,540,679 and 4,771,024. Thermal spray-drying of magnesium alkyl carbonate supports has been disclosed in U.S. Pat. No. 4,771,024. The materials frequently are unstable towards decomposition to mixed alkoxides and carbonates at above room temperature. Solutions of materials with R=methyl are only fully stable at elevated pressure; ethanol solutions with the R=ethyl material begin to decompose at the employed conventional spray-drying temperatures of 70° C. to 100° C. when nitrogen gas is used at inlet temperatures of 100° C. to 140° C. Ethanol solutions with Mg content above approximately 4% are too viscous for conventional spray drying on a commercial scale without undergoing partial decomposition, because the spray-drying temperature must be too high.

Magnesium chloride solvates of electron donors such as alcohols or ethers are well known in the art of olefin polymerization, such as described in U.S. Pat. Nos. 4,124,532 and 4,684,703, and their spray-drying, either by themselves (U.S. Pat. Nos. 3,953,414 and 4,111,835) or as adducts with titanium halides, are also known (U.S. Pat. No. 4,293,673). Solutions in tetrahydrofuran are especially troublesome, in that the solubility of magnesium chloride in tetrahydrofuran decreases by a factor of two between room temperature and 65° C. due to the undesired precipitation of the material in a less soluble and presumably polymeric form (K. Handlir, J. Holecek, and L. Benes, *Collection of Czechoslovak Chem. Commun.* 50: 2422, 1985). A method for decreasing the feasible spray-drying temperature and increasing solubility thus is highly desirable.

This invention may be used to form catalysts, catalyst supports, or catalyst precursors for heterogenous catalysis by spray drying a liquid precursor catalyst composition containing 1) a solids fraction containing the dry ingredients of a catalyst, catalyst support, or catalyst precursor and which is capable of forming particulates by solvent evaporation when sprayed as a decompressive spray; and 2) a solvent fraction which is at least partially miscible with the solids fraction and which is sufficiently volatile to render said precursor catalyst composition capable of forming particulates when sprayed as a decompressive spray. For spraying, the precursor catalyst composition is admixed with at least one compressed fluid to form a liquid mixture in a closed system, the compressed fluid being in an amount which renders the liquid mixture capable of forming a substantially decompressive spray. The liquid mixture is then sprayed at a temperature and pressure that gives a substantially decompressive spray by passing the mixture through an orifice into an environment suitable for forming particulates by solvent evaporation. The aforementioned teachings pertaining to forming solid particulates are understood to pertain, where applicable, to forming catalysts, catalyst supports, and catalyst precursors by the methods of the present invention, as will be understood by those skilled in the art, with the following discussion being particular to these catalyst materials.

The solids fraction of the precursor catalyst composition contains the dry ingredients of the catalyst, catalyst support, or catalyst precursor and may in general comprise at least one compound capable of functioning as a solid particulate catalyst, catalyst support, or catalyst precursor, which are known to those skilled in the art. Generally the at least one compound will comprise an inorganic compound or an organometallic compound. A polymeric compound such as a thermoplastic polymer may also be used as a binder in the catalyst support. The ingredients of the catalyst, catalyst support, or catalyst precursor may comprise any of the aforementioned materials used for olefin catalysis, including magnesium hydrocarbyl carbonates and magnesium chloride.

Here again, the solids fraction must be a sufficiently high fraction of the precursor catalyst composition to be capable of forming a particulates by solvent evaporation when sprayed by the decompressive spray, and to form particulates of sufficient size, but it must not be so excessively high as to be unable to form a substantially decompressive spray or to cause overly large particulates to form. The solids fraction should generally be greater than about 15% by weight of the precursor catalyst composition, preferably greater than about 20%, more preferably greater than about 25%, and most preferably greater than about 30%. The appropriate amount will depend upon the physical and chemical characteristics of the particular solids fraction, such as molecular weight and solubility. The solids fraction should generally be less than about 90% by weight of the precursor catalyst composition, preferably less than about 80%, more preferably less than about 70%, and most preferably less than about 60%. Although higher and lower viscosities may be used, the precursor catalyst composition will generally have a viscosity of from about 200 to about 5000 centipoise, preferably from about 500 to about 3000 centipoise, more preferably from about 800 to about 2000 centipoise, as measured at a temperature of about 25° C.

The solvent fraction is chosen to be at least partially miscible with the solids fraction and to be sufficiently volatile. Higher solubility is preferred. The solvents are preferably compatible with preserving the catalyst activity and stability of the catalyst material. Any of the aforementioned solvents may be used, depending upon their solubility and suitability for the particular catalyst system. If a polymeric compound is included in the solids fraction, preferably at least one active solvent for the polymer is used. As aforementioned, for catalyst materials used for olefin catalysis, the preferred solvents are alcohols such as ethanol; ethers such as tetrahydrofuran (THF); and esters. Here again, the solvent fraction desirably has an average relative evaporation rate greater than about 70, preferably greater than about 85, more preferably greater than about 105, still more preferably greater than about 140, and most preferably greater than about 175. The average relative evaporation rate is preferably less than about 4000, more preferably less than about 3000, and most preferably less than about 2000.

The at least one compressed fluid is preferably compatible with preserving the catalyst activity and stability of the catalyst material. The preferred compressed fluid may change with catalyst system. In general carbon dioxide or ethane are preferred, but ethylene, propane, or propylene, or a mixture, might be preferred for catalyst materials prepared for olefin catalysis in order to obtain synergy or compatibility with the polymerization operation.

The compressed fluid is preferably a supercritical fluid at the temperature and pressure at which the liquid mixture is sprayed. Although higher spray temperature is favored for more rapid solvent evaporation from the spray, the temperature must be compatible with maintaining catalyst activity, because some catalyst materials as aforementioned are sensitive to heat, particularly when in solvent. Therefore, the lowest spray temperature that gives a desirable decompressive spray and proper solvent evaporation is generally preferred, which will depend upon the particular system used.

The catalysts, catalyst supports, and catalyst precursors formed by the methods of the present invention in general desirably have an average particle size greater than about 10 microns, preferably greater than about 15 microns, and more preferably greater than about 20 microns. For some catalyst systems, an average particle size above about 25 microns is still more preferable, whereas for other systems, such as with highly porous particles, larger particles with an average particle size above about 40 microns are most preferable. In general, the average particle size is preferably less than about 200 microns, more preferably less than 150 microns, and still more preferably less than about 125 microns. For some catalyst systems, the average particle size is desirably less than 100 microns, and for other systems less than about 70 microns. The most favorable particle size will depend upon the particular application. The catalysts, catalyst supports, and catalyst precursors preferably have a narrow particle size distribution, as aforementioned.

To maintain catalyst activity and stability, for some moisture-sensitive catalyst systems a spray environment is preferred that has very low humidity or more preferably is moisture free. For oxygen-sensitive catalyst systems, the spray environment preferably has a low-oxygen content or more preferably is oxygen-free, such as a nitrogen atmosphere.

It has also been discovered that a liquid precursor catalyst composition having a solids fraction that contains at least one organic polymer and at least one inorganic or organometallic compound, when sprayed with compressed fluid, may form catalyst, catalyst support, or catalyst precursor particulates having novel and useful morphology and particle size. The individual particulate comprises an aggregate of solid microparticulates containing the at least one inorganic or organometallic compound, such as a microcolloidal precipitate, which are at least partially enclosed in a polymeric shell. The aggregation of microparticulates provides for a porous interior and the partially open, thin outer polymeric shell allows penetration of reactants to the interior and enables desirable larger particle sizes to be formed.

For example, a precursor catalyst composition containing 20% (by weight) of a magnesium ethyl carbonate composition containing fumed silica, 20% solid acrylic polymer, 30% ethanol, and 30% ethyl acetate was sprayed with 37% carbon dioxide in the liquid mixture at 60° C. and 1800 psig into ambient air. Electron microscope photographs showed that the catalyst support particulate thus formed comprised a porous aggregate of several solid microparticulates, which would contain the precipitated magnesium hydrocarbyl carbonate, all partially enclosed in an acrylic polymeric shell. The particle size distribution obtained is shown as distribution B in FIG. 2, where it is compared with conventional distribution A, which was obtained by thermal spray drying, using a rotary atomizer, of the magnesium ethyl carbonate composition in ethanol. The catalyst support particle sizes obtained with the compressed fluid are desirably substantially larger than the sizes for the conventional catalyst support. The decompressive spray also produced a narrower, monomodal particle size distribution than the broad, bimodal distribution produced by conventional spray drying, which also contained an undesirably large fraction of particles less than 10 microns in size. Furthermore, the conventional spray drying required a low solids level below 8% and a high temperature above 100° C. in a hot nitrogen atmosphere in a drying chamber.

This invention may also be used to form solid particulates or powder by spray drying a liquid water-borne composition containing 1) a nonvolatile materials fraction which is solid or capable of becoming solid, which is capable of being sprayed, and which is capable of forming solid particulates by evaporation when sprayed as a decompressive spray; and 2) a solvent fraction containing at least water; which is sufficiently volatile to render, and contains water in an amount which renders, said water-borne composition capable of forming solid particulates when sprayed as a decompressive spray. For spraying, the water-borne composition is admixed with at least one compressed fluid to form a liquid mixture in a closed system, the compressed fluid being a supercritical fluid at the temperature and pressure at which the liquid mixture is sprayed and which is substantially present in the liquid mixture as a finely dispersed liquid compressed fluid phase, in an amount which renders said liquid mixture capable of forming a substantially decompressive spray. The liquid mixture is sprayed at a temperature above about 40° C., preferably above about 50° C., and more preferably above about 55° C., and at a pressure, preferably above about 1200 psig, more preferably above about 1400 psig, that gives a substantially decompressive spray by passing the mixture through an orifice into an environment suitable for forming solid particulates by evaporation, preferably having a low humidity level. Because water has a higher heat of evaporation than organic solvents, a higher spray temperature is generally required. The water fraction preferably contains at least 35% water by weight. Here again, the nonvolatile materials fraction must be a sufficiently high fraction of the water-bone composition to be capable of forming solid particulates by evaporation when sprayed by the decompressive spray. The water-bone composition may be a solution or a dispersion. The solids fraction may contain at least one polymer which is a water-dispersible polymer or a water-soluble polymer. The solids fraction may also be a detergent composition or it may contain at least one other water-soluble organic material, or it may contain at least one water-soluble inorganic compound. The compressed fluid is preferably rendered capable of forming a liquid phase at supercritical temperature and pressure by the water-bone composition containing at least one component, such as a solvent, that is miscible with the compressed fluid. As disclosed in copending U.S. patent application Ser. No. 128,880, (now U.S. Pat. No. 5,419,487) filed Sep. 29, 1993, water-bone compositions containing a sufficient amount of a finely dispersed liquid compressed fluid phase can form a decompressive spray in the absence of significant compressed fluid solubility in the water phase. Although higher viscosities may be used if a substantially decompressive spray is formed, the water-bone composition will generally have a viscosity below about 2000 centipoise at a temperature of 25° C., preferably below about 1500 centipoise, more preferably below about 1000 centipoise, and most preferably below about 700 centipoise. Preferably, at least one gas flow is applied to the substantially decompressive spray to increase the rate of turbulent taking or the temperature within the spray or both, in order to increase the evaporation rate of the water. The aforementioned teachings pertaining to forming solid particulates from solvent-bone compositions are understood to pertain, where applicable, to forming solid particulates from water-bone compositions in the practice of this invention, unless indicated otherwise.

It has also been discovered that the decompressive spray can be used to apply drier coating films from water-bone coating compositions having conventional water levels, due to enhanced evaporation of water in the spray. The water-borne coating composition sprayed 1) contains a water level which renders the composition capable of being sprayed conventionally with no compressed fluid, 2) is capable of forming a coating on a substrate, and 3) contains a solvent fraction having at least about 35 percent water by weight. For spraying, the water-borne coating composition is admixed with at least one compressed fluid to form a liquid mixture in a closed system, the compressed fluid 1) being substantially present in the liquid mixture as a finely dispersed liquid compressed fluid phase and 2) being in an mount which renders the liquid mixture capable of forming a substantially decompressive spray. The liquid mixture is sprayed at a temperature and pressure that gives a substantially decompressive spray by passing the mixture through an orifice into an environment suitable for water evaporation and applying a coating to a substrate. Preferably the gaseous environment has a low humidity level.

Surprisingly, even though the compressed fluid may have little solubility in the water-borne coating composition, by using a finely dispersed liquid compressed fluid phase in the liquid mixture, the spray undergoes a transition from a liquid-film spray to a decompressive spray, as the compressed fluid level is increased or temperature is increased, in a manner similar to that aforementioned for water-free compositions having significant compressed fluid solubility. Preferred compressed fluids are carbon dioxide and ethane.

As used herein, it will be understood that the term "water-borne coating composition" includes not only coating compositions used to form protective or decorative coatings but also includes adhesives, release agents, lubricants, agricultural materials, and the like, which are capable of being sprayed to deposit a coating on a substrate. The water-borne coating compositions that may be used with the present invention will typically contain at least one polymer which is a water-dispersible polymer or a water soluble polymer and which is capable of forming a coating on a substrate. Applicable polymers include thermoplastic polymers, thermosetting polymers, crosslinkable film forming systems, two-component reactive polymer systems, and mixtures thereof, typically used in water-borne coating compositions sprayed conventionally with no compressed fluid. The polymers may be solid polymers or liquid polymers, and they may be dissolved, dispersed, or emulsified in the solvent fraction.

In particular, the polymers include acrylics, polyesters, polyvinyl resins such as polyvinyl acetate, alkyds, polyurethanes, epoxies, phenolic resins, cellulosic polymers such as methyl cellulose, hydroxyethyl cellulose, carboxymethyl cellulose, and nitrocellulose, amino polymers such as urea formaldehyde and melamine formaldehyde, polyethylene glycols and polypropylene glycols, polyomides, natural gums and resins, polymers containing silicon, and the like.

In addition to the polymers, the composition may contain conventional additives which are typically utilized in water-borne coatings. For example, pigments, pigment extenders, metallic flakes, fillers, surfactants, wetting agents, emulsifying agents, dispersing agents, thickeners, anti-foaming agents, coalescing agents, driers, ultraviolet absorbers, biocides, pH buffers, neutralizers, cross-linking agents, plasticizers, and mixtures thereof, may all be utilized.

In addition to the water, the solvent fraction may contain one or more organic solvents. The organic solvent may perform a variety of functions, such as to solubilize the polymer and other components, to give proper flow characteristics such as leveling, to adjust the drying rate, aid pigment dispersion, and the like. Generally the preferred organic solvents are water soluble, such as alcohols, glycol ethers, acetone, methyl ethyl ketone, and the like, that are typically used in water-borne coating formulations. Coupling solvents such as ethylene glycol ethers, propylene glycol ethers, and the like may also be used. The selection of a particular solvent fraction to form a given water-borne coating composition is well known to those skilled in the art of coatings.

Preferably, the water-borne coating composition has at least 70% of the water content used to spray the composition without compressed fluid, more preferably at least 80%, still more preferably at least 90%, and most preferably at least about 95%.

Preferably, the water-borne composition has a viscosity at a temperature of about 25° C. of less than about 200 centipoise, more preferably less than about 150 centipoise, still more preferably less than about 100 centipoise, and most preferably less than about 75 centipoise Conventional spray methods by which the water-borne coating composition would be sprayable without compressed fluid include air spray, high-volume low-pressure spray (HVLP), airless spray, air-assisted airless spray, and rotary atomizers.

When carbon dioxide dissolves in water, some of the carbon dioxide forms carbonic add, which increases the acidity and lowers the pH of the system. Therefore, when carbon dioxide is used as the compressed fluid with water-borne coating compositions that are sensitive to lowered pH level, particularly to acidic pH levels, preferably the pH of the liquid mixture is controlled to prevent polymer precipitation when the carbon dioxide is admixed with the water-borne composition. Preferably the pH is controlled by using a pH buffer. Buffers are commonly used in water-borne coating compositions to maintain the pH at a desirable level, as is known to those skilled in the art. One example of a buffer is a carbonate/bicarbonate buffer, which regulates the pH at about 10. The pH may also be controlled by using alkali or other basic materials such as ammonia, sodium hydroxide, calcium carbonate, and other salts.

The liquid compressed fluid phase is preferably finely dispersed into the liquid mixture by vigorously agitating or mixing the liquid mixture as the compressed fluid is admixed with the water-borne coating composition. How the materials are admixed is not critical to the practice of this invention, provided that the liquid compressed fluid phase becomes substantially finely dispersed in the liquid mixture. Static or powered mixers may be used. Forming and maintaining the finely dispersed liquid compressed fluid phase in the liquid mixture may be aided by using a dispersion, emulsifying, or stabilization agent for the compressed fluid in the practice of the present invention. Such agents are generally surfactant materials, such as TERGITOL® nonionic surfactant NP-10, that are used to produce more or less stable mixtures of immiscible liquids such as hydrocarbons in water (Martens, Charles R, Water-Borne Coatings, Van Nostrand Reinhold, New York, 1981). They promote ease of mixing by reducing interfacial tension. The surfactants generally comprise long chain molecules that have a hydrophilic end and a lipophilic end. Such surfactant materials are commonly used in water-borne coating compositions that contain dispersed polymers, as known by those skilled in the art. Such materials may also aid in forming and maintaining a dispersion of the liquid compressed fluid phase, which typically has properties similar to a hydrocarbon material. As much as five percent or more based on the vehicle solid weight may be required.

The amount of compressed fluid that is used in the liquid mixture should be such that the liquid compressed fluid phase remains substantially finely dispersed in the liquid mixture and gives proper atomization. If the mount of compressed fluid is excessively high, larger than desirable agglomerations of the liquid compressed fluid can form in the liquid mixture, which can become more difficult to maintain as a uniform dispersion. Therefore, although larger quantities may be used, the amount of compressed fluid present in the liquid mixture is preferably less than about 40 percent by weight, more preferably less than about 35 percent, still more preferably less than about 30 percent, and most preferably less than about 25 percent. The amount of compressed fluid present in the liquid mixture should be at least an amount which renders the liquid mixture capable of forming a substantially decompressive spray. The amount required will depend upon the viscosity and rheological properties of the water-borne coating composition. The liquid mixture preferably contains at least about 4 percent compressed fluid, more preferably at least about 6 percent compressed fluid, still more preferably at least about 10 percent compressed fluid, and most preferably at least about 15 percent compressed fluid.

Although higher pressures may be used, preferably the spray pressure is below about 3000 psi, more preferably below about 2000 psi. Preferably the spray pressure is above about 50 percent of the critical pressure of the compressed fluid, more preferably above about 75 percent of the critical pressure, and most preferably above the critical pressure. Preferably the pressure is high enough to enable the compressed fluid to form a liquid phase.

Preferably, the spray temperature of the liquid mixture is below about 150° C., more preferably below about 100° C., and most preferably below about 80° C. Preferably, the spray temperature is above about 25° C., more preferably above about 30° C., still more preferably above 40° C., and most preferably above 50° C., to increase the evaporation rate of the water.

The liquid mixture is preferably sprayed at a temperature and pressure at which the compressed fluid is a supercritical fluid. The compressed fluid is preferably rendered capable of forming a liquid phase at supercritical temperature and pressure by the water-bone composition containing at least one component, such as a solvent, that is miscible with the compressed fluid.

The water-bone coating composition preferably contains at least one organic solvent that is capable of being extracted from the water-bone coating composition into the compressed fluid, thereby enabling said compressed fluid to form the liquid compressed fluid phase at the supercritical temperature and pressure. It is understood that only a portion of the organic solvent, generally only a small portion, need be extracted from the water-borne coating composition in order to form the liquid compressed fluid phase.

Alternatively, the liquid mixture may contains in addition at least one organic solvent which is immiscible with the water-bone coating composition; which is at least partially miscible with the compressed fluid under pressure; and which is present at least in an amount which enables the compressed fluid to form the liquid compressed fluid phase at the supercritical temperature and pressure. This is desirable when the water-bone coating composition does not contain an extractable organic solvent or contains such solvent in insufficient quantity. It is particularly useful for spraying water-bone coating compositions containing water-dispersible polymers. Such insoluble organic solvents are typically hydrocarbon solvents such as pentane, hexane, heptane, octane, decane, toluene, xylene, and the like, including branched and aromatic hydrocarbons, but other insoluble solvents may also be used. The insoluble solvents preferably have a relatively high relative evaporation rate, preferably above about 100 (butyl acetate RER=100), such as pentane, hexane, and heptane, toluene, and the like, so that the solvent readily evaporates during spraying. The insoluble organic solvent should be used in a minimal amount that gives a sufficient amount of liquid compressed fluid phase for spraying, so as to minimize organic solvent emissions. Generally the amount of insoluble organic solvent will be between about 2 percent and about 25 percent of the total weight of water-borne coating composition and insoluble organic solvent, preferably between about 4 percent and about 20 percent, and more preferably between about 5 and about 15 percent.

Here too, an elongated orifice passageway with the characteristics aforementioned may be used to spray the liquid mixture.

Liquid spray droplets are produced which generally have an average diameter of one micron or greater. Preferably, the droplets have average diameters of about 5 to about 150 microns, more preferably from about 10 to about 100 microns, still more preferably from about 15 to about 70 microns, and most preferably from about 20 to about 50 microns.

The environment into which the water-borne coating composition is sprayed is not narrowly critical. Preferably, the liquid mixture is sprayed into air under conditions at or near atmospheric pressure. Other gaseous environments can also be used. The relative humidity should allow sufficient evaporation of water from the liquid spray in order to produce desirable coating formation on a substrate. Therefore excessively high relative humidity should be avoided and low relative humidity is preferred.

The liquid spray mixtures containing the compressed fluid may be prepared for spraying by any of the spray apparatus disclosed in the aforementioned patents or other apparatus. The spray apparatus may also be a UNICARB® System Supply Unit manufactured by Nordson Corporation to proportion, mix, heat, and pressurize coating compositions with compressed fluids such as carbon dioxide for the spray application of coatings.

While preferred forms of this invention have been described, it should be apparent to those skilled in the art that methods and apparatus may be employed that are different from those shown without departing from the spirit and scope thereof.

EXAMPLE 1

Liquid polymeric compositions containing cellulose acetate butyrate polymer were prepared by dissolving solid Eastman Chemical Cellulose Ester CAB-381-0.1 in different solvents for spraying with compressed carbon dioxide fluid. The polymer had molecular weights of 45,260 ($M_w$) and 19,630 ($M_n$).

Figure 2:
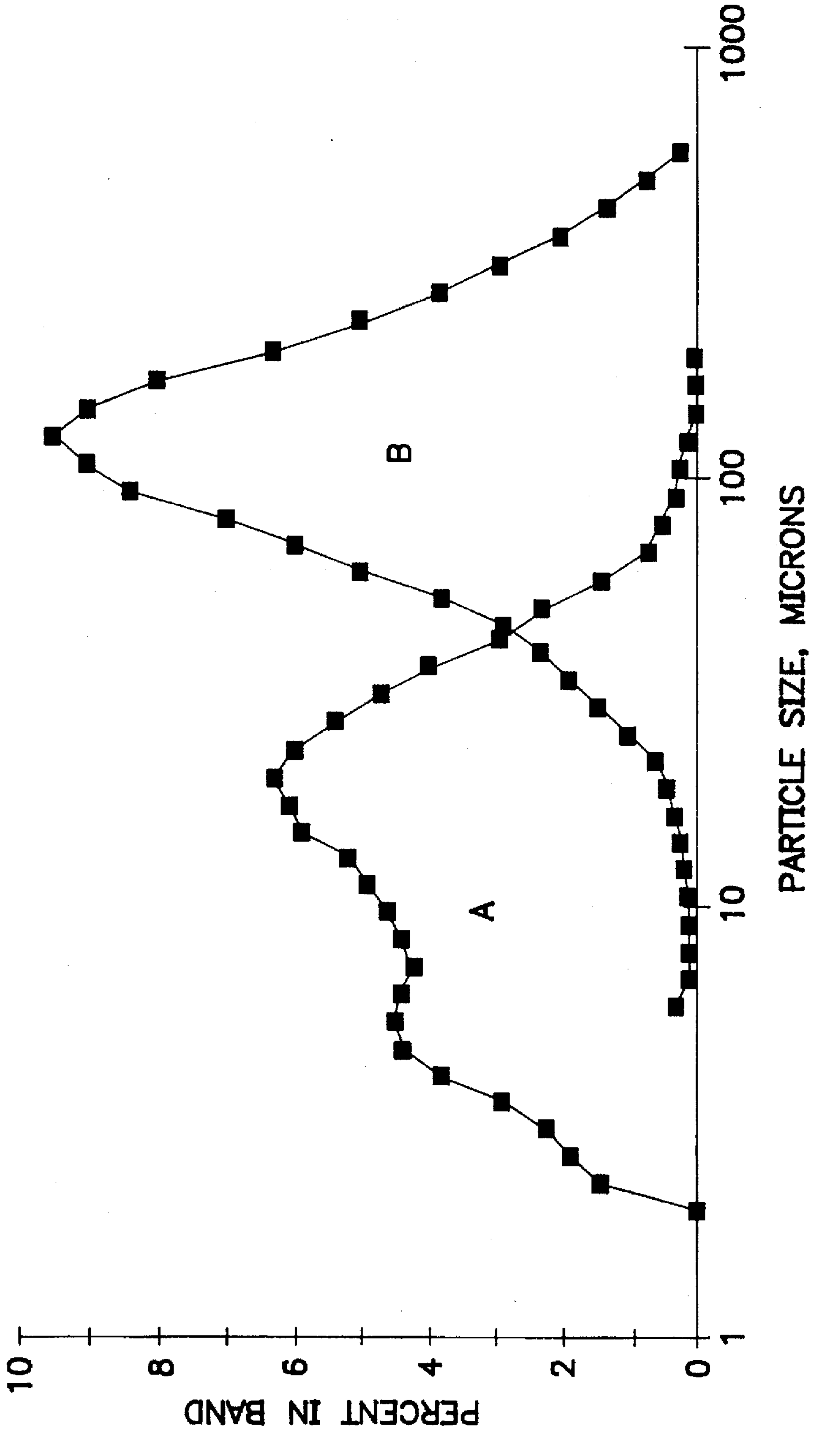
FIG. 2 compares particle size distributions for catalyst supports produced by using compressed fluid (A) and conventional thermal spray drying (B).

The composition and carbon dioxide were mixed and sprayed on a continuous basis by using the apparatus disclosed in FIG. 2 of U.S. Pat. No. 5,105,843. Carbon dioxide from a cylinder was pumped and regulated to the spray pressure, and a mass flow meter measured the mass flow rate of carbon dioxide fed through a check valve to the mix point. The composition was pumped from a tank and then metered by a precision gear pump. A gear meter measured the amount delivered through a check valve to the mix point. The speed of the gear pump was controlled by a signal from the mass flow meter to automatically produce the desired proportion of composition and carbon dioxide. The metering rate was adjusted by a feedback signal from the gear meter to correct pump inefficiency. The liquid mixture of composition and carbon dioxide was mixed in a static mixer and admixed with recycled liquid mixture. The circulation loop had a static mixer, piston-type accumulator, two heaters, filter, sight glass, spray gun, and circulation pump. A Nordson SCF-1 automatic spray gun was used with spray tip #123007, which had a 9-mil orifice size and a 10-inch fan width rating.

The first composition contained 30% polymer dissolved in 70% methyl ethyl ketone (by weight). The average relative evaporation rate (RER) was 631. A spray mixture having 45–46% carbon dioxide, a spray temperature of 50° C., and a spray pressure of 1800 psig (gauge) produced a clear spray solution and a parabolic decompressive spray with a width of 12–14 inches. Spraying a test panel showed that dry powder was produced throughout the spray pattern in the ambient air of the spray hood (about 25° C.) by a distances of 12 inches from the spray tip. A spray temperature of 60° C. produced dry powder by 9 inches. Spray dried powders were collected.

The second composition contained 40% polymer and 60% methyl ethyl ketone. A spray mixture with about 45% carbon dioxide at 50° C. and 1600 psig produced a two-phase mixture, a decompressive spray, and dry powder by 12-inches distance. Spraying at 60° C. also produced dry powder by 12 inches. Spray dried powder was collected and measured by a Malvern™ dry-particle sizer. The powder had an average particle size of 24 microns and a narrow distribution with only 12% of the particles (by volume) below 10 microns and only 10% above 55 microns in size. Using the pre-orifice (#138344) for the spray tip produced dry powder by 9 inches, which was collected.

The third composition contained 30% polymer and 70% butyl acetate. The average RER was 100. A spray mixture with 49% carbon dioxide at 60° C. and 1600 psig produced a clear solution and a decompressive spray. Dry powder was produced throughout the spray pattern by 18 inches. Spraying at 71° C. (solubility limit) produced dry powder by 12 inches. Spray dried powder was collected.

The fourth composition contained 30% polymer, 35% methyl ethyl ketone, and 35% methyl amyl ketone. The average RER was 75. A spray mixture with about 30% carbon dioxide at 50° C. and 1600 psig produced an angular liquid-film spray that remained liquid and produced no dry powder. Using 50% carbon dioxide produced a clear solution, a decompressive spray, and dry powder by 18 inches at both 50° C. and 60° C. For comparison, the composition was sprayed the same way at 60° C. with no carbon dioxide. This gave an angular liquid-film spray that remained liquid and produced no dry powder. For another comparison, using an air spray gun was tried, but the viscosity (780 centipoise) was too high to spray.

The fifth composition contained 30% polymer and 70% methyl amyl ketone. The average RER was 40. A spray mixture with about 55% carbon dioxide was sprayed at temperatures up to 70° C. and pressures up to 1600 psig, all of which gave decompressive sprays that remained liquid and produced no dry powder.

The sixth composition contained 25% polymer, 23% methyl ethyl ketone, 35% methyl amyl ketone, and 17% butyl CELLOSOLVE® acetate. The average RER was 12. A spray mixture with about 36% carbon dioxide at 60° C. and 1600 psig gave a decompressive spray that remained liquid and produced no dry powder.

EXAMPLE 2

Liquid polymeric compositions containing acrylic polymer were prepared by dissolving solid Robin & Haas Acryloid™ B-66 in different solvents. The polymer had molecular weights of 45,290 ($M_w$) and 24,750 ($M_n$).

The first composition contained 40% polymer and 60% acetone. The average RER was 1440. A Nordson SCF-1 spray gun was used with tip #123007 and the pre-orifice. A spray mixture with 35% carbon dioxide at 60° C. and 1800 psig produced a fishtail liquid-film spray that remained liquid. Using 43% carbon dioxide produced a clear solution (solubility limit), a decompressive spray, and dry powder in ambient air by 12-inches distance, which was collected.

The second composition contained 30% polymer and 70% acetone. A spray mixture with 40% carbon dioxide at 60° C. and 1800 psig produced a transition spray. Using 45% carbon dioxide produced a clear solution and a decompressive spray, and spray dried powder was collected. For comparison, the composition was sprayed the same way with no carbon dioxide. This airless spray gave a liquid-film spray that produced wet cobweb fibers and no dry powder. For another comparison, a composition of the polymer and acetone having a typical air spray viscosity of 93 centipoise was sprayed with an sir spray gun. This air spray also produced cobweb fibers and no powder.

The third composition contained 30% polymer and 70% methyl ethyl ketone. The average RER was 631. First, the Nordson SCF-1 spray gun was used with tip #123007 and no pre-orifice. A spray mixture with 42.5% carbon dioxide at 60° C. and 1600 psig produced a clear solution, a decompressive spray, and dry powder by 12-inches. Spray dried powder was collected and the particle size was measured. The powder had an average particle size of 21 microns and a narrow distribution with only 11% of the particles (by volume) below 10 microns and only 10% above 36 microns in size. For comparison, the composition was sprayed the same way with no carbon dioxide. This gave an angular liquid-film spray that produced wet cobweb fibers and no dry powder. For another comparison, a composition of the polymer and methyl ethyl ketone having a typical air spray viscosity of 94 centipoise was sprayed with an air spray gun. This air spray also produced large fibrous cobwebs and no powder. Second, a Graco AA3000 air-assisted airless spray gun was used with spray tip #163-309, which has a 9-mil orifice. A spray mixture with 42.5% carbon dioxide at 60° C. and 1600 psig produced a clear solution, a decompressive spray, and dry powder at a distance greater than 12 inches when no assist air was used. Using 20-psig atomization assist air, but no shaping air, produced dry powder (throughout the spray pattern) at less than 12 inches. Therefore increased turbulent mixing of surrounding air into the spray interior increased the evaporation rate. Heating the assist air to 30° C. and 40° C. gave dry powder at greater than 12 inches, and to 50° C. and 60° C. gave dry powder at less than 12 inches. Heating the assist air at constant air pressure decreased the air mass flow rate because the density was lower, but higher temperature increased volatility. Using 40 psig air at 23° C., 30° C., and 40° C. produced dry powder at less than 12 inches, and at 50° and 60° C. produced dry powder at less than 10 and 8 inches, respectively. Spray dried powder was collected at each condition.

The fourth composition contained 30% polymer and 70% methyl propyl ketone. The average RER was 269. The Nordson SCF-1 spray gun was used with tip #123007. A spray mixture with 42% carbon dioxide at 60° C. and 1800 psig produced a clear solution and a decompressive spray. Using the pre-orifice produced dry powder at less than 18-inches distance. Using no pre-orifice produced dry powder at greater than 18 inches. Spray dried powder was collected for each.

The fifth composition contained 30% polymer and 70% butyl acetate. The average RER was 100. The Graco spray gun was used with tip #163-309. A spray mixture with 43.5% carbon dioxide at 60° C. and 1600 psig produced a clear solution, a decompressive spray, and dry powder at greater than 24-inches distance with no assist air and with atomization air at 20 and 40 psig and 23°, 30°, 40°, and 50° C. Spray dried powder was collected for each case.

The sixth composition contained 40% polymer and 60% butyl acetate. A spray mixture with 44% carbon dioxide at 60° C. and 1600 psig produced a two-phase spray mixture and a decompressive spray. First, the Graco spray gun and tip #163-309 were used with no assist air and with atomization air at 20 and 40 psig and 23°, 30°, 40°, and 50° C. Second, the Nordson spray gun with spray tip #123007 and the pre-orifice were used without and with entrainment air applied to the spray by four ¼-inch copper tubes positioned with two outlets on each side of the spray fan at a distance of one inch from the spray and one inch above and below the spray centerline. Air was used at 20 and 40 psig and 22°, 30°, 40°, 50°, and 60° C. Dry powder was produced at greater than 24-inches distance and spray dried powder was collected for each case. For comparison, the composition was sprayed with no carbon dioxide by using the Nordson gun both with and without the pre-orifice at the same temperature and pressure. This gave an angular liquid-film spray with heavy side jets that produced wet stringy material and a heavy center jet that remained liquid and produced no dry powder.

The seventh composition contained 35% polymer and 65% methyl amyl ketone. The average RER was 40. A spray mixture with 42% carbon dioxide at 60° C. and 70° C. and 1600 psig gave a clear solution and a decompressive spray that remained liquid and produced no dry powder. The same results were obtained with 44% acrylic polymer and 56% methyl amyl ketone.

EXAMPLE 3

Liquid precursor coating-powder compositions containing an acrylic powder coating polymer were prepared by dissolving solid S. C. Johnson Polymer SCX-817 in different solvents. The polymer glass transition temperature was 68° C. and softening point was 120° C.

The composition and carbon dioxide were mixed on a batch basis by using the apparatus of Example 1 with no filter and one heater. The circulation loop was filled with spray mixture, the feeds closed, and pressure maintained by regulating nitrogen to the accumulator. A Nordson SCF-1 spray gun was used with spray tip #123006, which has a 9-mil orifice and an 8-inch fan width rating.

The first composition contained 50% SCX-817, 25% methyl ethyl ketone, and 25% butyl acetate. The average RER was 173. First no pre-orifice was used. A spray mixture with 20% carbon dioxide at 60° C. and 1800 psig gave a liqnid-film spray. Using 25% carbon dioxide gave a clear solution (solubility limit) and an angular spray with no visible liquid film. Increasing the temperature to 70° C. and pressure to 2050 psig gave a transitional spray. Using the pre-orifice gave a decompressive spray that produced dry powder (throughout the spray pattern) in ambient air at less than 18-inches distance from the spray tip. Spray dried powder was collected.

The second composition contained 45.0% SCX-817, 21.5% methyl ethyl ketone, 21.5% butyl acetate, and 12.0% acetone. The average RER was 214. Using the pre-orifice, a spray mixture with 23.7% carbon dioxide at 60° C. and 1800 psig gave a single-phase solution and a liquid-film spray that remained liquid and produced no spray dried powder. Increasing the temperature to 70° C. and the pressure to 2050 psig gave a transitional spray. Using 26.5% carbon dioxide gave a well-dispersed two-phase mixture and a decompressive spray that produced dry powder by 12-inches distance. Heated air was then applied locally by directing a hot air gun at the spray at a distance of 8–10 inches from the spray tip. Spray dried powder was collected for both cases.

The third composition contained 45.0% SCX-817, 31.4% acetone, 15.3% methyl ethyl ketone, and 8.3% butyl acetate. The average RER was 426. Using the pre-orifice, a spray mixture with 31% carbon dioxide at 60° C. and 1600 psig gave a well-dispersed two-phase mixture and a narrow parabolic decompressive spray. Dry powder was formed at greater than 24-inches distance, and spray dried powder was collected. Then entrainment air at 40 psig and 21° C. was applied to the spray by the tubular distributor of Example 2. This changed neither the spray shape nor width, but increased turbulent mixing of air into the spray interior. Dry powder was now produced (throughout the spray pattern) at less than 18-inches distance, so greater turbulent mixing increased the evaporation rate. Next the entrainment air was heated to 60° C. Dry powder was still produced at less than 18-inches distance. The mass flow rate of the heated air was lower due to lower density, so mixing was less intense, and the evaporation rate did not change appreciably, despite higher air temperature.

EXAMPLE 4

A liquid polymeric composition containing poly(vinyl chloride-vinyl acetate) copolymer was prepared by dissolving 25% solid Union Carbide Polymer VYHH in 75% acetone. The composition was put into a 10-liter stirred high-pressure heated autoclave and carbon dioxide to a 20% level was added from a weighed cylinder by a Haskel pump, which regulated the spray pressure, The spray mixture flowed from the bottom of the autoclave through a heated high-pressure hose to a Graco manual airless spray gun with Binks spray tip #9-0970. A thermocouple at the spray gun measured the spray temperature as 50° C. A pressure of 500 psig gave a liquid-film spray having a visible liquid film and side jets. The spray remained liquid and produced no spray dried polymer. Increasing the pressure to 700 psig increased the concentration of dissolved carbon dioxide and gave a transitional nearly decompressive spray having no liquid film and no side jets, which produced spray dried polymer in ambient air that was collected at a distance of about 24 inches from the spray tip.

EXAMPLE 5

This example first describes the preparation of magnesium ethyl carbonate used to prepare catalyst supports for olefin catalysis. Then compositions used for conventional thermal spray drying and for spraying with carbon dioxide are compared.

The following experimental procedure (step 1) was used for the carbonation of magnesium ethoxide to prepare a stock solution. Into a 1900-liter glass-lined reactor (equipped with a turbine agitator) were added 150 kilograms (kg) of magnesium ethoxide and 532 kg of ethanol under a nitrogen atmosphere (<10 ppmv water). The contents of the reactor were continuously stirred at about 50 rpm while carbon dioxide was continuously bubbled through the mixture at a rate of about 20–25 kg/hr, until 116 kg of carbon dioxide were fed. The reactor jacket temperature was maintained at below 35° C. for the duration of the carbonation reaction. The exotherm resulting from the addition of carbon dioxide caused the temperature of the mixture to rise about 5–10 degrees over a period of about 60 minutes. Additional carbon dioxide was added to achieve the desired stoichiometry. At the end, the magnesium ethoxide had completely dissolved in the ethanol to form a dear, viscous solution under a carbon dioxide atmosphere. Excess carbon dioxide was vented off and the mixture analyzed at 4.03% magnesium by weight. This mixture was used as a stock solution for further dilution and addition of inert fiber.

The following is a comparative example not in accordance with this invention which describes conventional thermal spray drying of magnesium ethyl carbonate to form a catalyst support. Sufficient fumed silica having a particle size in the range of from 0.1 to 1 micron (CAB-O-SIL® TS-610, manufactured by Cabot Corporation) was added to the stock solution prepared above (step 1). The mixture was stirred by a turbine agitator during this time and for several hours thereafter to thoroughly disperse the silica in the solution. The temperature of the mixture was held at 30° C. throughout this period and a nitrogen atmosphere (<5 ppm water) was maintained at all times. Additional ethanol was added as needed to achieve the desired magnesium content of the feed. The resulting slurry was spray dried by using an 8-foot diameter closed-cycle spray dryer equipped with a rotary atomizer. The atomizer speed could be adjusted to produce particles with a wide range of sizes. The scrubber section of the spray dryer was maintained at approximately –4° C. Nitrogen gas was introduced into the spray dryer at inlet temperatures of 100°–140° C. and was circulated at a rate of approximately 1700 kg/hr. The magnesium ethyl carbonate/fumed silica slurry was fed to the spray dryer at a temperature of about 35° C. and at a rate sufficient to yield an outlet gas temperature of approximately 70°–100° C. The atomization pressure was slightly above atmospheric. Note that some parties decarbonation does occur at the temperature of spray drying. Thermogravometric analyses have indicated that loss of carbon dioxide from a solid sample begins at temperatures as low as about 80° C. The decarbonation, however is only partial under these conditions.

The following describes compositions prepared for use with this invention in spraying magnesium ethyl carbonate compositions with compressed carbon dioxide. In one case slurries of silica filler and magnesium ethyl carbonate solution in ethanol were used to prepare the compositions. In a second case, thermally spray-dried particles were redissolved in ethanol. In this case there was noticeable uptake of gas upon exposure to carbon dioxide. In a third case, magnesium ethoxide was slurried in ethanol, added to a unit for mixing with carbon dioxide in preparation for spraying, and carboxylated in situ with carbon dioxide. In all cases, significantly higher magnesium content at significantly lower solution viscosity could be obtained at below 60° C. in mixed alcohol/supercritical carbon dioxide solutions than was possible in pure ethanol.

EXAMPLE 6

Liquid precursor catalyst compositions containing a magnesium ethyl carbonate solution and fumed silica dispersion in ethanol were prepared by the procedures described in Example 5. The average RER was 330. The apparatus and spray gun of Example 3 were used with spray tip #123007 and no pre-orifice.

The first composition had a 40% solids level (by weight). A spray mixture with 10% carbon dioxide at 60° C. and 1800 psig gave an angular liquid-film spray that remained liquid and produced no spray dried material. Spraying while continuously increasing the carbon dioxide concentration caused the spray to transition to a parabolic decompressive spray, which produced dry catalyst-support powder (throughout the spray pattern) in ambient air (circa 25° C.) at a distance of less than 14 inches from the spray tip.

The second composition had a 50% solids level. A spray mixture with 30% carbon dioxide at 30° C. and 1800 psig gave an angular liquid-film spray that remained liquid and produced no spray dried material. Increasing the temperature to 40° C. gave a transition spray. Increasing the temperature to 50° C. gave a parabolic decompressive spray with a width of about 14 inches, which produced dry powder in ambient air at less than 16-inches distance. The carbon dioxide was fully dissolved. Increasing the temperature to 60° C. gave a similar spray which produced dry powder at less than 12-inches distance. Spray dried catalyst-support powder was collected at both temperatures and stored under nitrogen.

The second composition was then sprayed by using compressed ethane fluid. A spray mixture with 10% ethane at 60° C. and 1800 psig gave an angular liquid-film spray that remained liquid and produced no spray dried material. Increasing the ethane concentration to 14.7% gave a parabolic decompressive spray that produced dry powder in ambient air at less than 12-inches distance. The ethane was fully dissolved. Spray dried catalyst-support powder was collected and stored under nitrogen. A Nordson A7A airless spray gun with Cross-Cut™ tip #711354 was then used at the same conditions to produce spray dried catalyst-support powder.

In contrast, the catalyst-support is spray dried conventionally by a rotary atomizer in a heated spray chamber. This requires a very low solids level below about 8% in order to atomize the material. It also requires a heated spray chamber to fully evaporate the ethanol. However, it is desirable to much lower spray and drying temperatures because the material is heat sensitive.

EXAMPLE 7

The liquid precursor catalyst composition contained 20% solid magnesium ethyl carbonate/fumed silica (prepared as described in Example 5), 20% solid Acryloid™ B-66 acrylic polymer, 30% ethanol, and 30% ethyl acetate. The average RER was 153. The apparatus and spray gun of Example 3 were used with spray tip #123007 and no pre-orifice. At 60° C. and 1800 psig, spray mixtures with 30%, 33%, and 37% carbon dioxide gave a transition spray, a nearly decompressive spray, and a decompressive spray, respectively. The carbon dioxide was fully dissolved. Spray dried catalyst-support powder from the decompressive spray was collected and stored under nitrogen. The powder had an average particle size of 113 microns and a narrow distribution compared to conventionally sprayed catalyst, which is desirable for fluidized reactors. Electron microscope photographs show that the catalyst particles have a unique particle structure, consisting of small porous aggregates of solid microparticulates encapsulated in a thin fractured polymer shell.

EXAMPLE 8

This example describes magnesium chloride solids level that can be used in liquid precursor catalyst compositions sprayed with carbon dioxide, in order to prepare catalyst supports for polyolefin catalysis, and how the level compares with the lower level used in conventional thermal spray drying.

A clear 0.6M solution of magnesium chloride in tetrahydrofuran (THF) was mixed with supercritical carbon dioxide at room temperature, and its dissolution behavior was monitored via a glass port. The clear solution had turned cloudy at 60° C., but remained sufficiently colloidal and non-viscous so that spraying could readily be conducted at that temperature. In contrast, thermal spray drying of the 0.6M solution/slurry in THF at 80°–110° C. produces unacceptable amounts of chips and agglomerates, necessitating a decrease of the magnesium chloride content to about 0.4M for thermal spray-drying without precipitation. Spraying using supercritical carbon dioxide by the methods of the present invention would thus permit a 50% increase in solids level in this case.

EXAMPLE 9

The liquid water-bone polymeric composition contained 57.50% Union Carbide CARBOWAX® PEG-8000, which is solid polyethylene glycol (molecular weight of 8000), 20.00% water, 11.25% acetone, and 11.25% methyl ethyl ketone. The average RER was 159. The apparatus and spray gun of Example 3 were used with tip #123007 and the pre-orifice. A spray mixture with 10% carbon dioxide at 40° C. and 1600 psig gave a finely dispersed liquid carbon dioxide phase that produced a narrow parabolic decompressive spray. The spray deposited a wet film on a test panel at 12 inches and a layer of tacky particles at 24-inches distance. At 50° C., the spray deposited a layer of tacky particles at 12-inches distance. Spraying at 60° C. produced dry powder at greater than 24 inches in ambient air, and spray dried powder was collected. Next entrainment air was applied to the spray from the tubular distributor of Example 2. Heated air at 20 psig gave dry powder (throughout the spray pattern) at distances of more than 24 inches (20° C. and 30° C.), 18 inches (40° C. and 50° C.), and 12 inches (60° C.). Heated air at 40 psig gave dry powder at distances of more than 24 inches (21° C.), 24 inches (30° C.), 18 inches (40° C.), 15 inches (50° C.), and 12 inches (60° C.). Spray dried powder was collected at each condition.

EXAMPLE 10

The liquid polymeric composition was a water-borne emulsion polymer system containing a solid acrylic polymer. A mixture with a minor amount of hexane was used for spraying with ethane. Because hexane does not dissolve in water, the average RER was 83.

The apparatus and spray gun of Example 3 were used with spray tip #123007 and the pre-orifice. The tubular distributor of Example 2 was used to supply heated air at 40 psig and 60° C. to the spray to increase the evaporation rate. A spray mixture with about 20% ethane at 65° C. and 1600 psig gave a finely dispersed liquid ethane phase, which produced a narrow parabolic decompressive spray. Dry powder was produced (throughout the spray pattern) by a distance of 24 inches from the spray tip. Spray dried powder was collected.

EXAMPLE 11

A water-borne coating composition that gives a CARBOWAX® coating was prepared from Union Carbide CARBOWAX® Polyethylene Glycol 8000, which is a water soluble solid polymer. The composition contained 35.5% polyethylene glycol, 56.6% water, and 7.9% methyl ethyl ketone (by weight). The composition had a typical air spray viscosity of 78 centipoise (23° C.) and a conventional water content.

The apparatus and spray gun of Example 3 were used with spray tip #123007 and the pre-orifice. A spray mixture with 15% carbon dioxide produced a decompressive spray at 40° C. and 1600 psig. At a spray temperature of 50° C., the spray mixture contained a finely dispersed liquid carbon dioxide phase and produced a steady parabolic feathered decompressive spray having an average droplet size of 38 microns, as measured by a Malvern™ 2600 droplet sizer. A wood test panel, 12-inch by 12-inch in size, was sprayed with the decompressive spray, which applied a very uniform CARBOWAX® coating having no sags or runs, despite the low viscosity, due to the high evaporation rate produced in the spray. A spray temperature of 60° C. produced a feathered decompressive spray having an average droplet size of 37 microns. A wood test panel was sprayed and a very uniform CARBOWAX® coating having no sags or runs was applied.

For comparison, the water-borne coating composition was sprayed by using an air spray gun. This produced an air spray having an average droplet size of 43 microns. However, despite having a feathered spray pattern and having approximately the same average droplet size as the decompressive sprays, the air spray applied poor coatings that were very non-uniform to the wood test panels, because the coatings were much wetter and less viscous due to the higher water content of the deposited coating, which caused runs and sags even in relatively thinly applied coatings. Therefore the decompressive sprays deposited drier coatings, because more water evaporated in the decompressive sprays than in the air spray.

For another comparison, the water-borne coating composition was sprayed by an airless spray using the same spray tip, pre-orifice, and spray pressure, but with no carbon dioxide, at spray temperatures of 50° C. and 60° C. This produced liquid-film sprays with average droplet sizes of 37 and 34 microns (center of spray), respectively, that deposited very wet coatings on wood test panels, which caused sags and runs even in relatively thinly applied coatings in both cases. Therefore, despite having approximately the same average droplet sizes, the decompressive sprays deposited drier coatings, because more water evaporated than in the conventional airless sprays.

We claim:

1. A process for forming solid particulates which comprises:

(1) forming a liquid mixture in a closed system, said liquid mixture comprising:

(a) a solvent-borne composition comprising:

(i) a nonvolatile materials fraction which is solid or capable of becoming solid, which is capable of being sprayed, and which is capable of forming solid particulates by solvent evaporation when sprayed; and (ii) a solvent fraction which is sufficiently volatile to render said solvent-borne composition capable of forming solid particulates when sprayed and which solvent fraction has an average relative evaporation rate greater than about 70; and (b) at least one compressed fluid in an amount which when added to (a) renders said liquid mixture capable of forming a substantially decompressive spray, wherein the compressed fluid is a gas at standard conditions of 0° Celsius and one atmosphere pressure (STP); and (2) spraying said liquid mixture at a temperature and pressure that gives a substantially decompressive spray by passing the mixture through an orifice into an environment suitable for forming solid particulates by solvent evaporation, wherein the spray has an average particle size greater than about one micron.

2. The process of claim 1 wherein said at least one compressed fluid is selected from the group consisting of carbon dioxide, nitrous oxide, ethane, ethylene, propane, and propylene.

3. The process of claim 1 wherein said at least one compressed fluid is a supercritical fluid at the temperature and pressure at which said liquid mixture is sprayed and said liquid mixture is heated to a temperature that substantially compensates for the drop in spray temperature that occurs due to expansion cooling of the decompressing compressed fluid, in order to increase the evaporation rate of solvent from the spray.

4. The process of claim 1 wherein the solid particulates thus formed have a narrow particle size distribution.

5. The process of claim 1 wherein at least one gas flow is applied to the substantially decompressive spray to increase the rate of turbulent mixing or the temperature within the spray or both.

6. A process for forming a coating-powder which comprises:

(1) forming a liquid mixture in a closed system, said liquid mixture comprising:

(a) a precursor coating-powder composition comprising:

(i) a solids fraction containing dry ingredients of a coating-powder and which is capable of forming powder by solvent evaporation when sprayed; and (ii) a solvent fraction which is at least partially miscible with (i) and which is sufficiently volatile to render said precursor coating-powder composition capable of forming powder when sprayed; and (b) at least one compressed fluid in an amount which when added to (a) renders said liquid mixture capable of forming a substantially decompressive spray, wherein the compressed fluid is a gas at standard conditions of 0° Celsius and one atmosphere pressure (STP); and (2) spraying said liquid mixture at a temperature and pressure that gives a substantially decompressive spray by passing the mixture through an orifice into an environment suitable for forming coating powder by solvent evaporation.

7. The process of claim 6 wherein said at least one compressed fluid is carbon dioxide or ethane and is a supercritical fluid at the temperature and pressure at which said liquid mixture is sprayed.

8. The process of claim 6 wherein the coating powder formed has a narrow particle size distribution with a span of less than about 2.0.

9. The process of claim 6 wherein the coating powder contains at least one polymer selected from the group consisting of epoxies, polyesters, acrylics, polyurethanes, epoxy-polyester hybrids, blocked isocyanates, cellulosics, vinyls, polyamides, and hybrid polymers thereof.

10. The process of claim 6 wherein at least one gas flow is applied to the substantially decompressive spray to increase the rate of turbulent mixing or the temperature within the spray or both.

11. A process for forming solid particulates which comprises:

(1) forming a liquid mixture in a closed system, said liquid mixture comprising:

(a) a water-borne composition comprising:

(i) a nonvolatile materials fraction which is solid or capable of becoming solid, which is capable of being sprayed, and which is capable of forming solid particulates by evaporation when sprayed; and (ii) a solvent fraction containing at least water; which is sufficiently volatile to render, and contains water in an amount which renders, said water-borne composition capable of forming solid particulates when sprayed; and (b) at least one compressed fluid which is a supercritical fluid at the temperature and pressure at which said liquid mixture is sprayed and which is substantially present in said liquid mixture as a finely dispersed liquid compressed fluid phase, in an amount which renders said liquid mixture capable of forming a substantially decompressive spray, wherein the compressed fluid is a gas at standard conditions of 0° Celsius and one atmosphere pressure (STP); and (2) spraying said liquid mixture at a temperature above about 40° Celsius and a pressure that gives a substantially decompressive spray by passing the mixture through an orifice into an environment suitable for forming solid particulates by evaporation.

* * * * *